United States Patent
Broering et al.

(10) Patent No.: US 11,958,660 B2
(45) Date of Patent: Apr. 16, 2024

(54) THERMOPLASTIC BAGS WITH PHASED DEFORMATION PATTERNS

(71) Applicant: THE GLAD PRODUCTS COMPANY, Oakland, CA (US)

(72) Inventors: Shaun T. Broering, Fort Thomas, KY (US); Matthew W. Waldron, West Chester, OH (US); Jason R. Maxwell, Elgin, IL (US); Robert T. Dorsey, Western Springs, IL (US); Michael G. Borchardt, Naperville, IL (US); Edward B. Tucker, Yorkville, IL (US); Jack F. Melvan, Oak Forest, IL (US); Richard D. Palmer, Sycamore, IL (US); Deborah K. Fix, Maineville, OH (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 0 days.

(21) Appl. No.: 17/424,448

(22) PCT Filed: Jan. 29, 2020

(86) PCT No.: PCT/US2020/015580
§ 371 (c)(1),
(2) Date: Jul. 20, 2021

(87) PCT Pub. No.: WO2020/160088
PCT Pub. Date: Aug. 6, 2020

(65) Prior Publication Data
US 2022/0135285 A1 May 5, 2022

Related U.S. Application Data

(60) Provisional application No. 62/798,259, filed on Jan. 29, 2019.

(51) Int. Cl.
*B65D 33/02* (2006.01)
*B31B 70/00* (2017.01)
(Continued)

(52) U.S. Cl.
CPC ............ *B65D 33/02* (2013.01); *B31B 70/008* (2017.08); *B65D 33/28* (2013.01); *B65D 65/40* (2013.01);
(Continued)

(58) Field of Classification Search
CPC ........ B65D 33/02; B65D 33/28; B65D 65/40; B65D 81/264
(Continued)

(56) References Cited

U.S. PATENT DOCUMENTS 5,205,650 A * 4/1993 Rasmussen ............ B64D 17/02
428/167
6,403,174 B1 * 6/2002 Copeta ..................... B32B 3/30
428/34.3
(Continued)

FOREIGN PATENT DOCUMENTS

CN      207312156 U     5/2018
WO     2016/014329      1/2016
(Continued)

OTHER PUBLICATIONS

Application No. PCT/US2020/015580 International Search Report dated Jun. 11, 2020.
(Continued)

*Primary Examiner* — Jes F Pascua
(74) *Attorney, Agent, or Firm* — Keller Preece PLLC

(57) ABSTRACT

Thermoplastic bags with phased deformation patterns are described. In particular, one or more implementations comprise thermoplastic bags with ring rolling, SELFing, or other deformation patterns phased or aligned relative to the sides
(Continued)

of the bags. The phased deformation patterns can allow for reducing or eliminating deformation patterns in areas of the thermoplastic bag in which side seals or other seals are formed. Additionally or alternatively, the phased deformation patterns can provide for zones that provide differing properties (e.g., functional or aesthetic). Such zones can vary aligned along a width of the thermoplastic bag and optionally also vary along a height of the thermoplastic bag. The differing zones can provide the thermoplastic bags with phased deformations that provide leak prevention, liquid containment, and other benefits.

20 Claims, 14 Drawing Sheets

(51) Int. Cl.
  B65D 33/28 (2006.01)
  B65D 65/40 (2006.01)
  B65D 81/26 (2006.01)
  B31B 170/20 (2017.01)
(52) U.S. Cl.
  CPC ........ B65D 81/264 (2013.01); *B31B 2170/20* (2017.08)
(58) Field of Classification Search
  USPC .................. 383/101, 105, 112, 116, 118
  See application file for complete search history.

(56) References Cited

U.S. PATENT DOCUMENTS

| | | | |
|---|---|---|---|
| 6,799,680 B2 * | 10/2004 | Mak .................. | B65D 81/2038 206/524.8 |
| 7,938,581 B2 * | 5/2011 | Ping .................. | B65D 81/2038 383/105 |
| 9,272,459 B2 | 3/2016 | Waldron et al. | |
| 9,365,324 B2 | 6/2016 | Wilcoxen et al. | |
| 10,081,169 B2 | 9/2018 | Broering et al. | |
| 10,138,054 B2 | 11/2018 | Cobler et al. | |
| 2002/0003910 A1 * | 1/2002 | Jackson .................. | B65D 31/02 383/118 |
| 2002/0126919 A1 * | 9/2002 | Jackson .................. | B65D 33/00 383/42 |
| 2005/0178493 A1 * | 8/2005 | Broering .................. | B31B 70/98 156/197 |
| 2010/0014789 A1 * | 1/2010 | Binger ............... | B65D 81/2023 383/109 |
| 2010/0046860 A1 * | 2/2010 | Kent ..................... | B65F 1/0006 383/75 |
| 2010/0195937 A1 * | 8/2010 | Fraser .................. | B65F 1/0006 383/105 |
| 2011/0117307 A1 * | 5/2011 | Fraser .................. | B32B 37/0076 156/290 |
| 2012/0033900 A1 * | 2/2012 | Fraser ............... | B29C 66/81435 156/227 |
| 2012/0039550 A1 * | 2/2012 | MacPherson ............. | B32B 7/04 428/167 |
| 2012/0063706 A1 * | 3/2012 | Fraser ............... | B29C 66/81435 493/243 |
| 2012/0064271 A1 * | 3/2012 | Broering .................. | B32B 7/05 156/290 |
| 2013/0094787 A1 | 4/2013 | Broering et al. | |
| 2013/0188891 A1 * | 7/2013 | Maxwell ................. | B65F 1/002 383/114 |
| 2013/0243982 A1 * | 9/2013 | Borchardt .................. | B32B 3/30 428/167 |
| 2015/0003757 A1 * | 1/2015 | Wilcoxen ............ | B32B 37/0076 428/167 |
| 2015/0104121 A1 * | 4/2015 | Broering ............... | B65D 75/006 493/186 |
| 2016/0039169 A1 | 2/2016 | Broering et al. | |
| 2018/0194099 A1 * | 7/2018 | Wilcoxen .......... | B29C 66/73322 |
| 2018/0244433 A1 * | 8/2018 | Borchardt ......... | B29C 66/73921 |

FOREIGN PATENT DOCUMENTS

| | | | | |
|---|---|---|---|---|
| WO | WO-2019094298 A1 * | 5/2019 | ............. | B29C 55/08 |
| WO | WO-2019212672 A1 * | 11/2019 | ............. | B29C 65/56 |
| WO | WO-2019217400 A1 * | 11/2019 | ............. | B31B 70/79 |

OTHER PUBLICATIONS

Application No. PCT/US2020/015580 Written Opinion of the International Searching Authority dated Jun. 11, 2020.
Office Action as received in Chinese application 202080011643X dated Aug. 18, 2022 [no English translation available].
Office Action as received in Chinese application 202080011643.X dated Jan. 19, 2023.

* cited by examiner

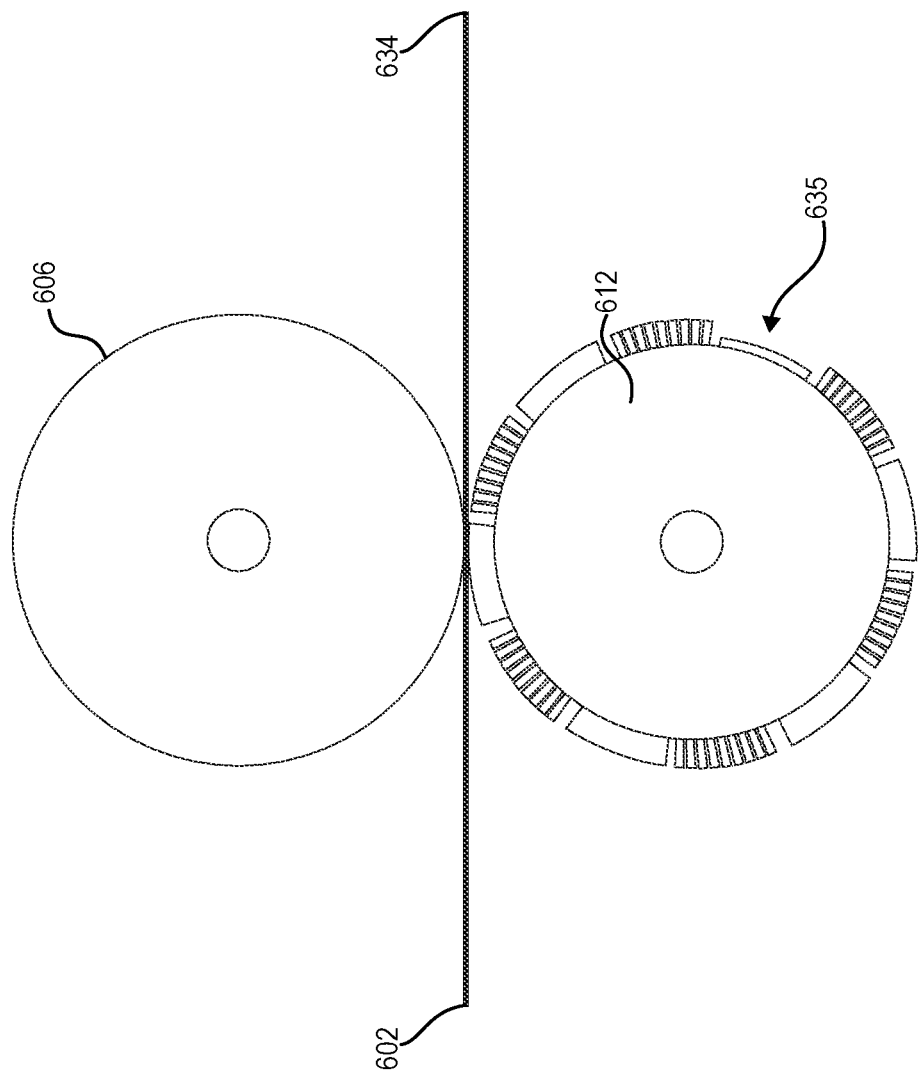

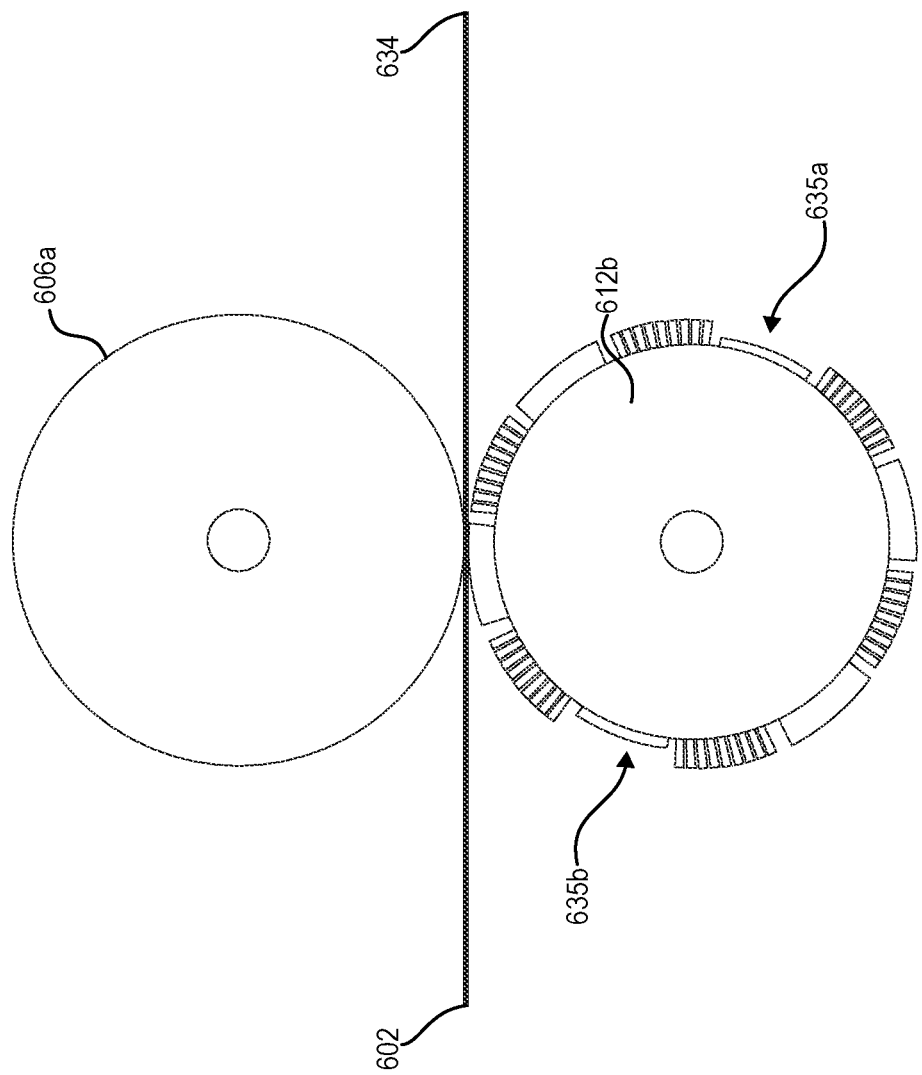

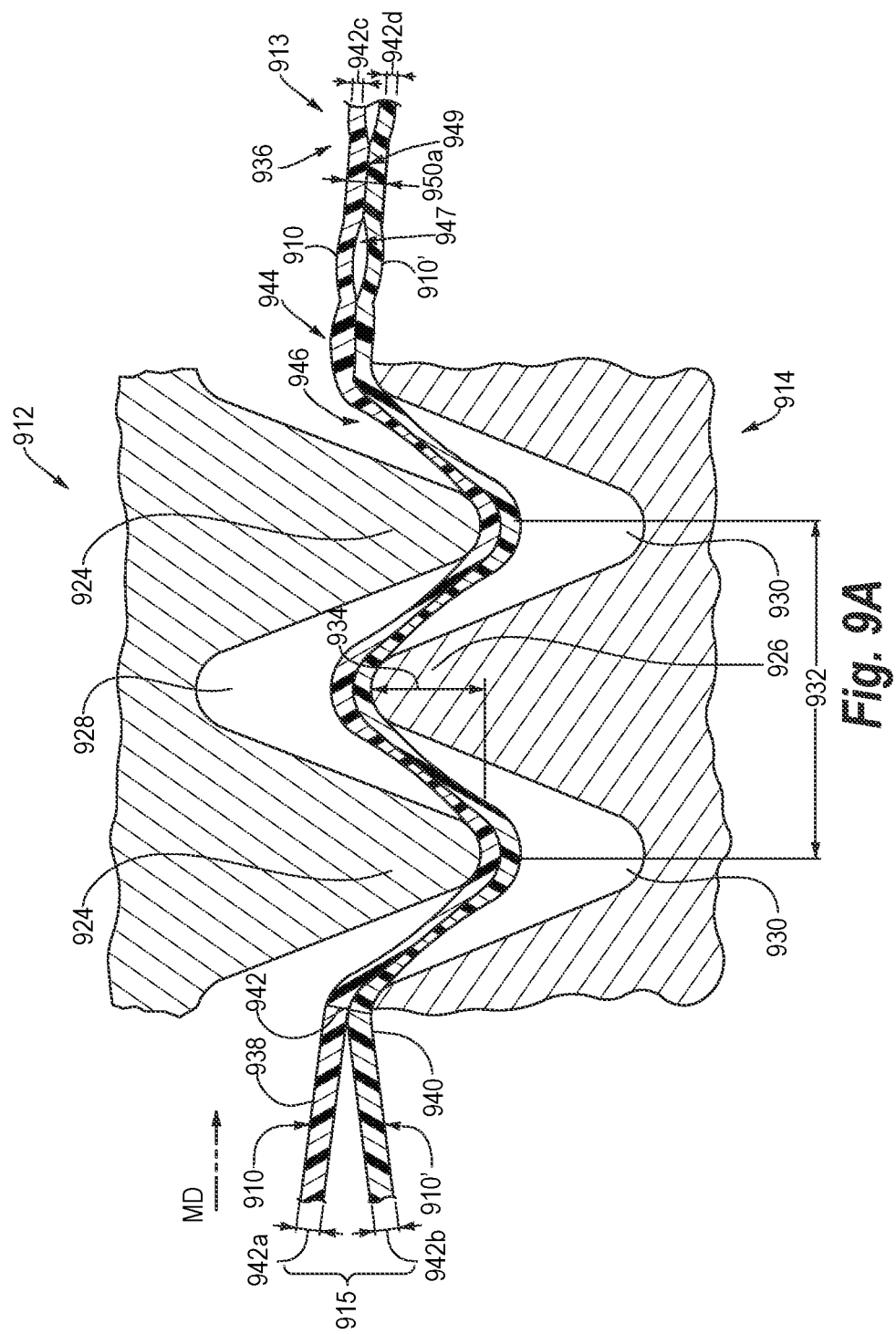

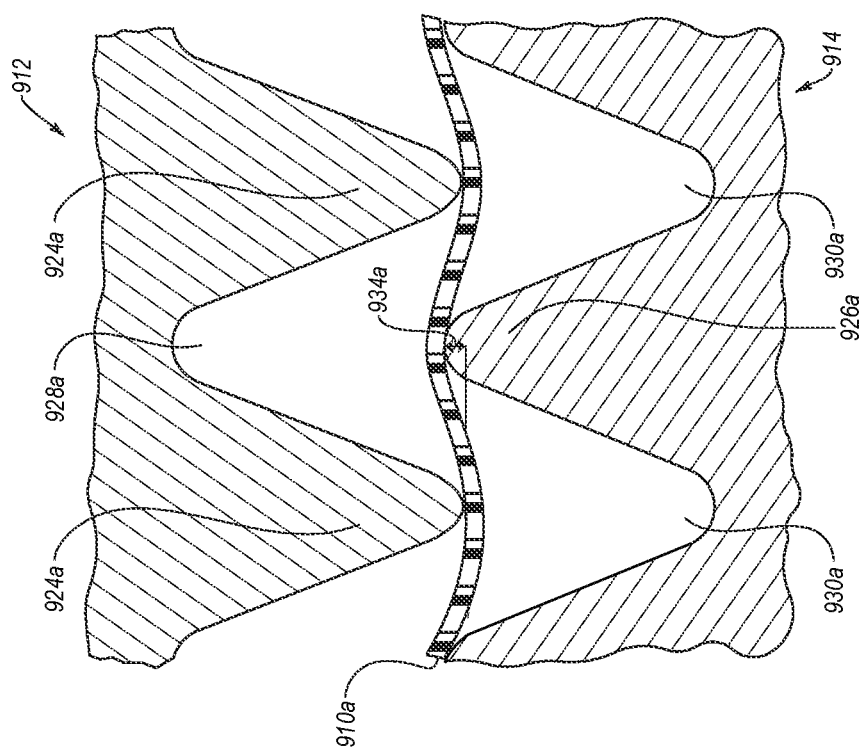

THERMOPLASTIC BAGS WITH PHASED DEFORMATION PATTERNS

CROSS-REFERENCE

This application claims the benefit of and priority to U.S. Provisional Application No. 62/798,259, filed on Jan. 29, 2019. The disclosure is herein incorporated by reference in its entirety.

BACKGROUND

1. Technical Field

The present application relates generally to thermoplastic films and structures formed therefrom. More particularly, the present invention relates to thermoplastic bags with phased deformation patterns.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for its intended use. For example, manufacturers may attempt to increase or otherwise control the tensile strength, tear resistance, and impact resistance of a thermoplastic film. Manufacturers may attempt to control or change the material properties of a thermoplastic film by stretching the film. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction. As used herein, the term "diagonal direction" or "DD" refers to a direction across the film that is at an angle to both the transverse and machine directions.

One form of stretching is incremental stretching. Incremental stretching of a thermoplastic film typically involves running the film between grooved or toothed rollers. The grooves or teeth on the rollers intermesh and incrementally stretch the film as the film passes between the rollers. Incremental stretching can stretch a film in small increments that are spaced across the film. The depth at which the intermeshing teeth engage can control the degree of stretching. Often, incremental stretching of films is referred to as ring rolling. Incremental stretching can be in the machine, transverse, or diagonal direction or combinations thereof.

Another type of post formation deformation involves forming a structural elastic-like film (SELF). SELFing involves passing a film through intermeshing rollers that press a portion of the film out of plane to cause permanent deformation of the portion of the film in the Z-direction. SELFing a film can increase the elasticity of the film.

While ring rolling and SELFing can provide a film with desirable properties, these processing techniques can have drawbacks. For example, both ring-rolled and SELFed thermoplastic films, when formed into bags, have deformation patterns that are continuous from one side of the bag to the opposing side of the bag due to manufacturing constraints. The continuous nature of conventional ring rolling and SELFing result in side seals that are formed over areas that have been ring rolled or SELFed. Forming side seals over areas that have been ring rolled or SELFed can lead to weakened seals due to a zippering effect (e.g., inconsistent sealing of the films). Similarly, the thinning of the films in the areas in which the seals are formed can lead to pins holes or other weaknesses. Weakened seals can lead to leaks or even failure of the bag.

BRIEF SUMMARY

One or more implementations of the present invention provide benefits and/or solve one or more of the foregoing or other problems in the art with thermoplastic bags having phased deformation patterns. In particular, one or more implementations comprise thermoplastic bags with ring rolling, SELFing, or other deformation patterns phased or aligned relative to the sides of the bags. For example, one or more implementations involve forming bags using tooling phased relative to a width of the thermoplastic bags. More specifically, the tooling is sized and configured such that one revolution (or fraction thereof) equals the width of a thermoplastic bag. In this manner, the tooling can be configured to generate deformation patterns that vary from a first side of the thermoplastic bag, along a width of the thermoplastic bag, to an opposing side of the thermoplastic bag. For instance, one or more implementations include reducing or eliminating deformation patterns in areas of the thermoplastic bag in which side seals or other seals are formed. Additional or alternative implementations include thermoplastic bags with zones having differing deformation patterns that provide differing properties (e.g., functional or aesthetic). Such zones can vary aligned along a width of the thermoplastic bag and optionally also vary along a height of the thermoplastic bag. The differing zones can provide the thermoplastic bags with phased deformations that provide leak prevention, liquid containment, and other benefits.

One embodiment includes a thermoplastic bag comprising first and second sidewalls of a thermoplastic film material. The thermoplastic bag includes a first side seal securing respective first side edges of the first and second sidewalls together. The thermoplastic bag also includes a second side seal securing respective second side edges of the first and second sidewalls together. A bottom edge extends from the first side edges to the second sided edges can connects the first and second sidewalls. The thermoplastic bag further includes a pattern of deformations formed in the first and second sidewalls. The pattern of deformations extend a length between the first and second side edges less than a width of the thermoplastic bag.

Another embodiment includes a thermoplastic bag with first and second sidewalls of a thermoplastic film material. The thermoplastic bag includes a first side seal securing respective first side edges of the first and second sidewalls together. The thermoplastic bag also includes a second side seal securing respective second side edges of the first and second sidewalls together. A bottom edge extends from the first side edges to the second sided edges can connects the first and second sidewalls. A first area, in the first wall, comprises a first pattern of deformations. A second area, in the first wall, comprises a second pattern of deformations. The first area is between the second area and the first side edge of the first wall. The second area is between the first area and the second side edge of the first wall.

In addition to the foregoing, a method of forming thermoplastic bags with phased deformations comprises advancing a thermoplastic film into a pair of intermeshing rollers. The method further involves advancing the thermoplastic film through the intermeshing rollers thereby creating deformations in the thermoplastic film. A single rotation of the intermeshing rollers spans a first length of the thermoplastic film. The method further involves forming pairs of side seals in the thermoplastic film thereby defining thermoplastic bags having a width that is a multiple of the first length.

Additional feature and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific implementations thereof that are illustrated in the appended drawings. It should be noted that the figures are not drawn to scale, and that elements of similar structure or function are generally represented by like reference numerals for illustrative purposes throughout the figures. Understanding that these drawings depict only typical implementations of the invention and are not therefore to be considered to be limiting of its scope, the invention will be described and explained with additional specificity and detail through the use of the accompanying drawings in which:

FIG. 6C illustrates a side view of the pair of phased intermeshing rollers of FIG. 6A in accordance with one or more implementations of the present invention;

FIG. 7 illustrates a side view of another pair of phased intermeshing rollers registered to the width of multiple bags in accordance with one or more implementations of the present invention;

FIG. 9A illustrates an enlarged cross-sectional view of a pair of thermoplastic films passing through phased intermeshing rollers to create a laminate with phased deformations in accordance with one or more implementations of the present invention;

FIG. 9B illustrates an enlarged cross-sectional view of a pair of thermoplastic films passing through phased intermeshing rollers to create a zone lacking deformations in accordance with one or more implementations of the present invention.

DETAILED DESCRIPTION

Figure 1C:
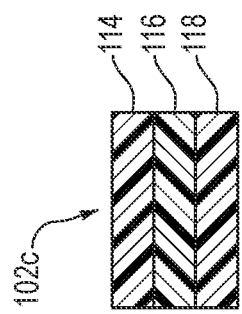
FIGS. 1A-1C illustrate views of various films in accordance with one or more implementations of the present invention.

One or more implementations of the present invention include thermoplastic bags having phased deformation patterns. In particular, one or more implementations comprise thermoplastic bags with deformation patterns, or a lack thereof, that vary from a first side of the thermoplastic bag, along a width of the thermoplastic bag, to an opposing side of the thermoplastic bag. One or more implementations include tailoring a thermoplastic bag to include zones with differing deformation patterns to provide the different zones with differing aesthetic or functional properties.

For instance, one or more implementations include bags with one type or pattern of deformations proximate the seals that provide increase elasticity so as to absorb forces and reduce stress and strain on the seals. The same bag can include a zone between the areas proximate the side seals with another differing type or pattern of deformations. As an example, the center of the bag can include patterns that include functional stretching or that direct liquid away from the side seals or corners of the bag to reduce leaks. More particularly, the center of the bag can include a pattern of deformations that cause the center of the bag to stretch more than the sides so that liquids pool at a point away from the seals.

Still further, in one or more implementations zones at the sides of the bag can be devoid of deformations, while zones in the middle of the bag can include deformations. In this manner the portions of the bag including the side seals can be devoid of deformations. The lack of deformations in the portions of the bag including the side seals can provide sides seals with increased strength. For example, the lack of deformations can avoid zippering effects created by forming seals through portions of film with deformations. Furthermore, the lack of deformations and associated stretched film portions can ensure that the areas in which the side seals are formed are thick and uniform, leading to strong seals and reduce leaking and failing of side seals.

As used herein, the term "deformation" or "deformations" refer to structures permanently formed in a thermoplastic film. For example, deformations can comprise alternating thicker ribs and thinner webs formed from ring rolling, rib-like elements formed from SELFing, or displaced designs formed by embossing. As used herein, the term "deformation pattern" or "deformation patterns" refers to a series of repeating deformations. As used herein, the term "phased deformation patterns" refers to a pattern of deformations that vary from a first side of the thermoplastic bag, along a width of the thermoplastic bag, to an opposing side of the thermoplastic bag. In other words, phased deformation patterns are deformation patterns that do not repeat consistently or uniformly across a width of a thermoplastic bag. For example, phased deformation patterns comprise a first zone with a first deformation pattern and a second zone with a second deformation pattern, where the first and second zones are aligned, at least partially, along a width of the thermoplastic bag. Alternatively, a first zone can have a deformation pattern that is deeper than a second zone.

To create phased deformation patterns, one or more embodiments include the use of the intermeshing rollers that are sized and configured based on a width of a thermoplastic bag. In other words, the intermeshing rollers are phased or registered to correspond to a multiple of a width of the thermoplastic bag. The intermeshing rollers have teeth or gears that vary along the circumference of the intermeshing rollers so as to produce a pattern in a film that varies from one side of a bag to an opposing side of the bag.

By phasing the ring rolling or SELFing of a thermoplastic film, one or more implementations provide a thermoplastic bag with zones or sections with tailored strength and/or aesthetic characteristics. For example, one or more implementations include reducing or eliminating ring rolling or SELFing in areas of the thermoplastic in which side or other seals are formed in a thermoplastic bag. Still further implementations include thermoplastic bags with varying patterns of ring rolling or SELFing that create zones or sections with unique performance in the machine direction, transverse direction, or both. For instance, one or more implementations include thermoplastic bags with zones that have differing functional properties (stretch differently, direct liquids differently, have differing strength or other material properties) or aesthetic properties.

In one or more implementations the thermoplastic bag with phased deformation patterns can comprise one or more visual cues that indicate areas of the bag with differing physical properties. The visual cue can comprise a patterns, ribs, stretching or other visible characteristics. For example, in one or more implementations a thermoplastic bag with phased deformation patterns having a first pattern (e.g., design of incremental stretching or SELFing) in a first zone and a second pattern in a second zone, where the second pattern differs from the first pattern. The first pattern can provide a visual cue that the first zone of thermoplastic bag with phased deformation patterns has one (or one set of) physical properties and/or functional benefits. The second pattern can provide a visual cue that the second zone of the thermoplastic bag with phased deformation patterns has another (or another set of) physical properties and/or functional benefits.

The structures of one or more implementations can comprise multiple films (e.g., two or more). One or more implementations can involve laminating the layers of thermoplastic films via ring rolling, a structural elastic like film (SELF) process, embossing, adhesives, ultrasonic bonding, or other techniques. In this manner the laminating of the layers can create non-continuous bonding.

The non-continuous bonding can enhance the strength and other properties of the thermoplastic bag with phased deformation patterns. In particular, one or more implementations provide for forming bonds between adjacent films of a thermoplastic bag with phased deformation patterns that are relatively light such that forces acting on the thermoplastic bag with phased deformation patterns are first absorbed by breaking the bonds rather than, or prior to, tearing or otherwise causing the failure of the films of the thermoplastic bag with phased deformation patterns. Such implementations can provide an overall thinner structure employing a reduced amount of raw material that nonetheless has maintained or increased strength parameters. Alternatively, such implementations can use a given amount of raw material and provide a structure with increased strength parameters.

In particular, the light bonds or bond regions of adjacent films of thermoplastic bags with phased deformation patterns in accordance with one or more implementations can act to first absorb forces via breaking of the bonds prior to allowing that same force to cause failure of the individual films of the thermoplastic bags with phased deformation patterns. Such action can provide increased strength to the thermoplastic bags with phased deformation patterns. In one or more implementations, the light bonds or bond regions include a bond strength that is advantageously less than a weakest tear resistance of each of the individual films so as to cause the bonds to fail prior to failing of the films. Indeed, one or more implementations include bonds that the release just prior to any localized tearing of the layers of the thermoplastic bags with phased deformation patterns.

Thus, in one or more implementations, the light bonds or bond regions of thermoplastic bags with phased deformation patterns can fail before either of the individual layers undergoes molecular-level deformation. For example, an applied strain can pull the light bonds or bond regions apart prior to any molecular-level deformation (stretching, tearing, puncturing, etc.) of the individual films. In other words, the light bonds or bond regions can provide less resistive force to an applied strain than molecular-level deformation of any of the layers of the thermoplastic bags with phased deformation patterns. The inventors have surprisingly found that such a configuration of light bonding can provide increased strength properties to the thermoplastic bags with phased deformation patterns as compared to a monolayer film of equal thickness or a non-continuously laminated structure in which the plurality of films are tightly bonded together or continuously bonded (e.g., coextruded).

One or more implementations provide for tailoring the bonds or bond regions between layers of a thermoplastic bags with phased deformation patterns to ensure light bonding and associated increased strength. For example, one or more implementations include modifying or tailoring one or more of a bond strength, bond density, bond pattern, or bond size between adjacent layers of thermoplastic bags with phased deformation patterns to deliver a structure with strength characteristics better than or equal to the sum of the strength characteristics of the individual films. Such bond tailoring can allow for thermoplastic bags with phased deformation patterns at a lower basis weight (amount of raw material) to perform the same as or better than higher basis weight mono-layer or co-extruded films. The bonds between the layers of the thermoplastic bags with phased deformation patterns can be tailored to fail when subjected to forces consistent with objects being placed into the garbage bag, consistent with the garbage bag being removed from a container (e.g., garbage can), or consistent with the garbage bag being carried from one location to another location.

One or more implementations include incrementally stretching or other post formation (e.g., post extrusion) processing of thermoplastic films to create phased deformations. For example, one or more implementations includes incrementally stretching a film using MD ring rolling, TD ring rolling, diagonal direction ("DD") ring rolling, the formation of strainable networks, embossing, or combinations thereof. Incrementally stretching a film using the methods described herein can impart ribs or other structures to the film and increase or otherwise modify one or more of the tensile strength, tear resistance, impact resistance, or elasticity of the film. Furthermore, one or more implementations involve post formation processes with ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. Such cold incremental stretching can help provide the unexpected result of maintaining or increasing the strength of a thermoplastic film, despite a reduction in gauge.

An overview of suitable thermoplastic materials, thermoplastic films, and methods of making the same are described in the following paragraphs and FIGS. 1A-1C. After this description, a description of thermoplastic bags including phased deformations is provided as well as details on the process of forming phased deformations.

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; p=0.920). Additionally, other examples use a gas phase LLDPE, which is a hexene gas phase LLDPE formulated with slip/AB (MI=1.0; p=0.920). Still further examples use a gas phase LLDPE, which is a hexene gas phase LLDPE formulated with slip/AB (MI=1.0; p=0.926). One will appreciate that the present invention is not limited to LLDPE, and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present invention.

Indeed, implementations of the present invention can include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to a thermoplastic material, films of one or more implementations of the present invention can also include one or more additives. Additional additives that may be included in one or more embodiments include slip agents, anti-block agents, voiding agents, or tackifiers. Additionally, one or more implementations of the present invention include films that are devoid of voiding agents. Some examples of inorganic voiding agents include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. Some examples of organic voiding agents for polyethylene (PE) include polystyrene and other polymers incompatible with PE and having the proper viscosity ratio relative to PE.

In one or more embodiments, the films of one or more implementations can comprise a pigment that provides a color. As used herein, the term "pigment or pigments" are solids of an organic and inorganic nature which are defined as such when they are used within a system and incorporated into the thermoplastic, absorbing part of the light and reflecting the complementary part hereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, White Lead, Lithopone, Clay, Magnesium Silicate, Barytes ($BaSO_4$), and Calcium Carbonate ($CaCO_3$).

One will appreciate in light of the disclosure herein that manufacturers may form the films or webs to be used with one or more implementations of the present invention using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, one or more films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment. In one or more implementations, a manufacturer can use multiple extruders to supply different melt streams, which a feed block can order into different channels of a multi-channel die. The multiple extruders can allow a manufacturer to form a film with layers having different compositions.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more embodiments, the extrusion process can orient the polymer chains of the blown film. In particular, the extrusion process can cause the polymer chains of the blown film to be predominantly oriented in the machine direction. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more embodiments the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more embodiments the polymer chains of the blown film are predominantly oriented in the machine direction (i.e., oriented more in the machine direction than the transverse direction).

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.35 mils and about 0.6 mils. Additionally, the starting gauge of films of one or more implementations of the present invention may not be uniform. Thus, the starting gauge of films of one or more implementations of the present invention may vary along the length and/or width of the film.

As described above, one or more implementations of a film may itself include a single layer or multiple layers. In other words, the individual films may each themselves comprise a plurality of laminated layers. Such layers may be significantly more tightly bonded together than the bonding provided by the purposely bonding as described in greater detail below. Both tight and relatively weak lamination can be accomplished by joining layers by mechanical pressure, joining layers with adhesives, joining with heat and pressure, spread coating, extrusion coating, and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1B:
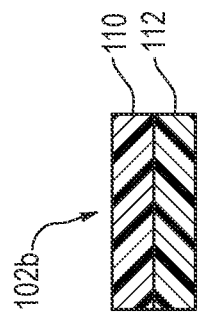
Figure 1A:
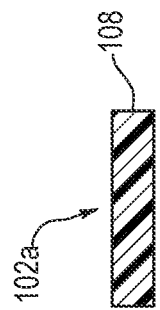

FIGS. 1A-1C illustrate individual films for use in one or more implementations. FIG. 1A illustrates a film 102a of a single layer 108. In another implementation, as illustrated by FIG. 1B, a film 102b can have two layers (i.e., a bi-layered film). In particular, the film 102b can include a first layer 110 and a second layer 112. The first and second layers 110, 112 can optionally include different grades of thermoplastic material or include different additives, including polymer additives. In still another implementation, shown in FIG. 1C, a film 102c can include three layers (i.e., a tri-layered film). For example, FIG. 1C illustrates that the film 102c can include a first layer 114, a second layer 116, and a third layer 118. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the films can comprise layer ratios of 20:20:60, 40:40:20, 15:70:15, 33:34:33, 20:60:20, 40:20:40, or other ratios.

Example films include a three-layer B:A:B structure, where the ratio of layers can be 20:60:20. The exterior B layers (i.e., 114, 118) can comprise a mixture of hexene LLDPE of density 0.918, and metallocene LLDPE of density 0.920. The interior A core layer (116) can comprise a mixture of hexene LLDPE of density 0.918, butene LLDPE of density 0.918, reclaimed resin from trash bags.

In another example, the film 102c is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 102c.

Figure 2:
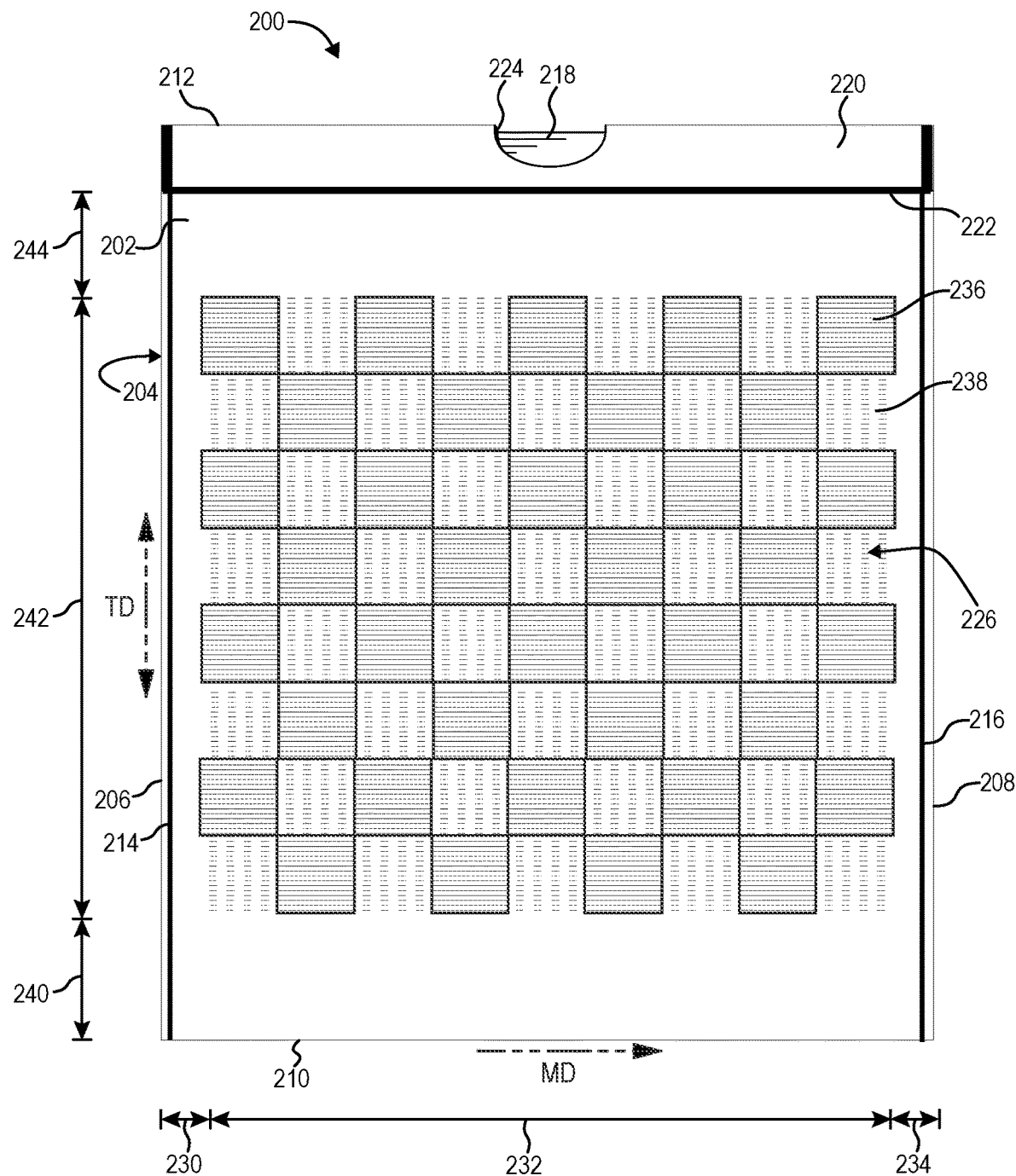
FIG. 2 illustrates a view of a thermoplastic bag with phased deformation patterns in accordance with one or more implementations of the present invention.

Referring now to FIG. 2, an implementation of a thermoplastic bag 200 having phased deformation patterns is shown. The thermoplastic bag 200 includes a first sidewall 202 and a second sidewall 204. Each of the first and second sidewalls 202, 204 can comprise one of the films 102a, 102b, 102c described above in relation to FIGS. 1A-1C. Each of the first and second sidewalls 202, 204 includes a first side edge 206, a second opposite side edge 208, a bottom edge 210 extending between the first and second side edges 206, 208. The first and second sidewalls 202, 204 also include a top edge 212 extending between the first and second side edges 206, 208 opposite the bottom edge 210.

In some implementations, the first sidewall 202 and the second sidewall 204 are joined together along the first side edges 206, the second opposite side edges 208, and the bottom edges 210. The first and second sidewalls 202, 204 may be joined along the first and second side edges 206, 208 and bottom edges 210 by any suitable process such as, for example, a heat seal. In particular, FIG. 2 illustrates that a first side seal 214 secures the first and second sidewalls 202, 204 together proximate the first side edges 204. Similarly, a second side seal 216 secures the first and second sidewalls 202, 204 together proximate the second side edges 208. In alternative implementations, the first and second sidewalls 202, 204 may not be joined along the side edges. Rather, the first and second sidewalls 202, 204 may be a single uniform piece. In other words, the first and second sidewalls 202, 204 may form a sleeve or a balloon structure.

In some implementations, the bottom edge 210 or one or more of the side edges 206, 208 can comprise a fold. In other words, the first and second sidewalls 202, 204 may comprise a single unitary piece of material. The top edges 212 of the first and second sidewalls 202, 204 may define an opening to an interior of the thermoplastic bag 200 having phased deformation patterns. In other words, the opening may be positioned opposite the bottom edge 210 of the thermoplastic bag 200 having phased deformation patterns. Furthermore, when placed in a trash receptacle, the top edges 212 of the first and second sidewalls 202, 204 may be folded over the rim of the receptacle.

In some implementations, the thermoplastic bag 200 having phased deformation patterns may optionally include a closure mechanism located adjacent to the top edges 212 for sealing the top of the thermoplastic bag 200 to form an at least substantially fully-enclosed container or vessel. As shown in FIG. 2, in some implementations, the closure mechanism comprises a draw tape 218 positioned with in a hem 220. In particular, the top edges 212 of the first and second sidewalls 202, 204 may be folded back into the interior volume and may be attached to an interior surface by a hem seal 222 to form the hem 220. The draw tape 218 extends through the hem 220 along the top edge 212. The hem 220 includes apertures 224 (e.g., notch) extending through the hem 220 and exposing a portion of the draw tape 216. During use, pulling the draw tape 218 through the apertures 224 will cause the top edge 212 to constrict. As a result, pulling the draw tape 218 through the apertures 224 will cause the opening of the thermoplastic bag 200 having phased deformation patterns to at least partially close or reduce in size. The draw tape closure mechanism may be used with any of the implementations described herein.

Although the thermoplastic bag 200 having phased deformation patterns is described herein as including a draw tape closure mechanism, one of ordinary skill in the art will readily recognize that other closure mechanisms may be implemented into the thermoplastic bag 200 having phased deformation patterns. For example, in some implementations, the closure mechanism may include one or more of flaps, adhesive tapes, a tuck and fold closure, an interlocking closure (e.g., zipper closure), a slider closure, or any other closure structures known to those skilled in the art for closing a bag. Furthermore, while FIG. 2 illustrates that the thermoplastic bag 200 having phased deformation patterns is a trash bag, in other embodiments, the thermoplastic bag 200 having phased deformation patterns can comprise a food bag, or other type of thermoplastic bag.

As mentioned above, the thermoplastic bag 200 includes phased deformation patterns. In other words, the thermoplastic bag 200 does not include a single deformation pattern that extends across the entire width of the bag 200. For example, FIG. 2 shows that a checkerboard pattern 226 of deformations does not extend across the entire width of the bag 200. In particular, the checkerboard pattern 226 of deformations formed in the first and second sidewalls extends a length between the first and second side edges 206, 208 that is less than an entire width of the thermoplastic bag 200.

In particular, along the width of the bag 200 there is a first zone, section, or area 230, a second zone, section, or area 232, and a third zone, section, or area 234. The first zone 230 extends from the first side edges 206 toward the second side edges 208. The third zone 234 extends from the second side edges 208 toward the first side edges 206. The second zone 232 is positioned between the first zone 230 and the third zone 234. As shown the first and third zones 230, 234 are devoid of deformations. Thus, the deformations vary across the width of the thermoplastic bag 200 from areas devoid of deformations to areas including deformations.

As the first and third zones 230, 234 are devoid of deformations, the first and third zones 230, 234 can have an average gauge or thickness greater than the average gauge or thickness of the middle section including the checkerboard pattern 226 of deformations. In one or more implementations, each of the first and third zones 230, 234 are 230 is between 1/16th an inch and 8 inches in length and extends in height from the bottom edge 210 to the top edges 212. In other implementations, the each of the first and third zones 230, 234 is between 1 inch and 4 inches. In one or more embodiments, the widths of the first zone 230 and the third zone 234 are equal. In alternative embodiments, the first zone 230 and the third zone 234 have unequal or differing widths.

A shown by phased deformations can provide the differing zones with differing functional and/or aesthetic characteristics. In particular, the increased thickness and uniformity of the first and third zones 230, 234 can help ensure that the side seals 214, 216 positioned therein are strong. Similarly, the checkerboard pattern 226 of deformations can provide the center of the bag 200 the ability to expand to accommodate trash or other objects inserted into the bag 200.

Furthermore, the differing look and feel of the phased zones can provide signals to a consumer of the differing properties. For example, the increased thickness of the first and third zones 230, 234 can signal strength to the user. Similarly, the checkerboard pattern 226 can signal flexible and stretchable strength.

As shown by FIG. 2, the checkboard pattern 226 of deformations can comprise a repeating pattern of raised rib-like elements. In particular, the checkboard pattern 226 of deformations can include a first plurality of rib-like elements arranged in a macro pattern 236 and a second plurality of raised rib-like elements arranged in a micro pattern 238. The macro and the micro patterns 236, 238 of raised rib-like elements can repeat across middle zone 232 of the thermoplastic bag 200 to form a checkerboard pattern. In one or more implementations, the macro pattern 236 is visually distinct from the micro pattern 238. As used herein, the term "visually distinct" refers to features of a film which are readily discernible to the normal naked eye when the web material or objects embodying the web material are subjected to normal use.

As used herein a macro pattern is a pattern that is larger in one or more ways than a micro pattern. For example, as shown by FIG. 2, the macro pattern 236 has larger/longer raised rib-like elements than the raised rib-like elements of the micro pattern 238. In alternative implementations, the surface area of a given macro pattern covers more surface area than a surface area covered by a given micro pattern. In still further implementations, a macro pattern can include larger/wider web portions between adjacent raised rib-like elements than web portions between adjacent raised rib-like elements of a micro pattern.

FIG. 2 illustrates phased deformations that form differing zones along the width of the bag 200. Additionally, as shown by FIG. 2, the bag 200 can include zones with differing deformations along a height of the bag 200. In particular, along the height of the bag 200 there is a fourth zone, section, or area 240, a fifth zone, section, or area 242, and a sixth zone, section, or area 244. The fourth zone 240 extends from the bottom edge 210 toward the top edges 212. The six zone 244 extends from the top edges 212 toward the bottom edge 210. The fifth zone 242 is positioned between the fourth zone 240 and the sixth zone 244. As shown the fourth and sixth zones 240, 244 are devoid of deformations. Thus, the deformations vary across the height of the thermoplastic bag 200 from areas devoid of deformations to areas including deformations.

As the fourth and sixth zones 240, 244 are devoid of deformations, the fourth and sixth zones 240, 244 can have an average gauge or thickness greater than the average gauge or thickness of the middle section including the checkerboard pattern 226 of deformations. In one or more implementations, each of the fourth and sixth zones 240, 244 is between $1/16^{th}$ an inch and 8 inches in height and extends in width from the first side edges 206 to the second side edges 208. In other implementations, the each of the fourth and sixth zones 240, 244 is between 1 inch and 4 inches in height. In one or more embodiments, the heights of the fourth and sixth zones 240, 244 are equal. In alternative embodiments, the fourth zone 240 and the sixth zone 244 have unequal or differing widths.

FIG. 2 illustrates a thermoplastic bag 200 with a single deformation pattern (e.g., the checkerboard pattern). The present invention is not so limited. In alternative implementations, the thermoplastic bags can include multiple different deformations patterns that vary along the width and optionally the height of the bag. Each of the different deformation patterns can provide differing benefits to the different locations/zones of the thermoplastic bag with phased deformations.

Figure 3A:
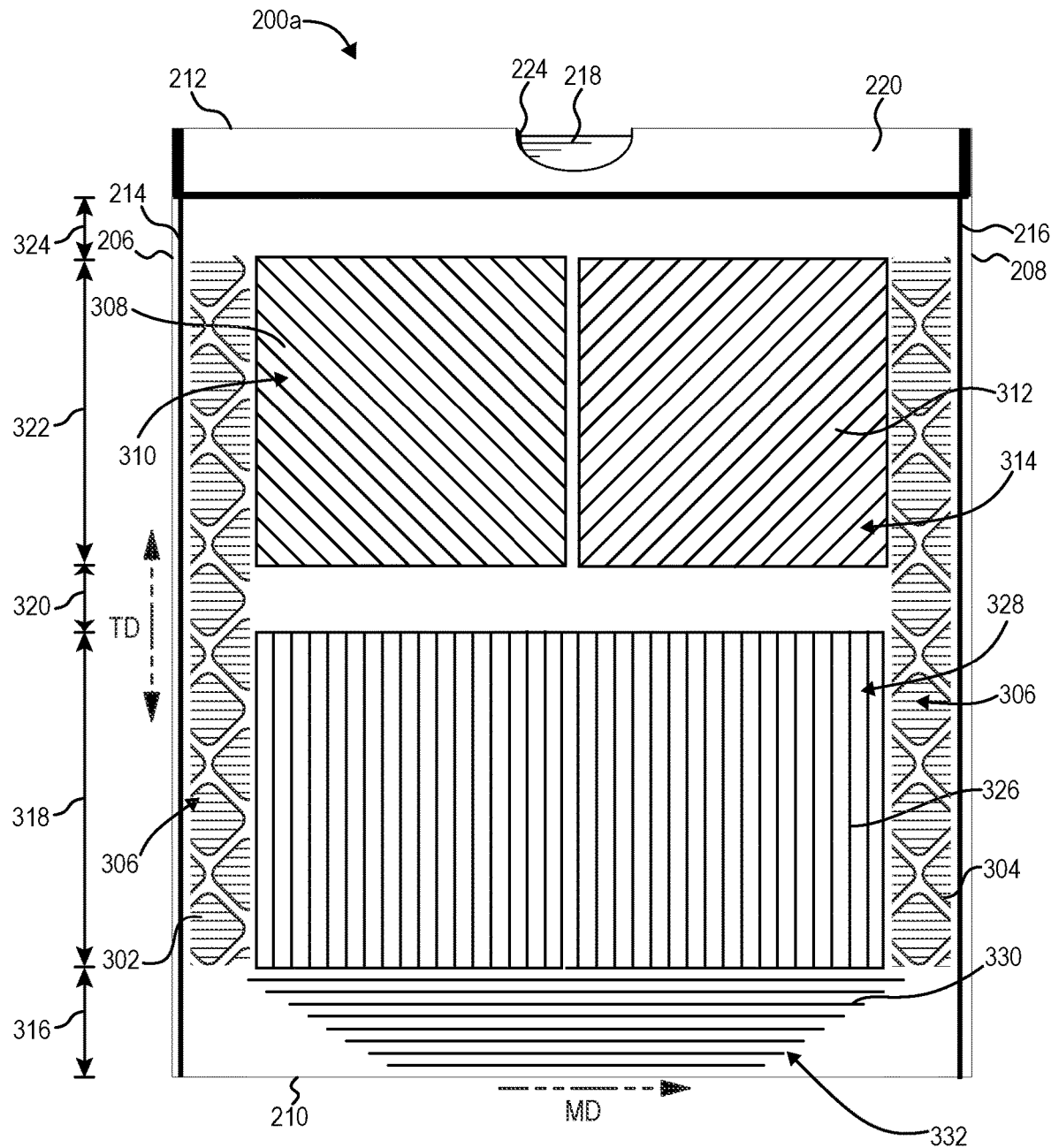
FIG. 3A illustrates a view of thermoplastic bag with phased deformation patterns in accordance with one or more implementations of the present invention.

For example, FIG. 3A illustrates a thermoplastic bag 200a with phased deformations with multiple differing deformation patterns. In particular, the thermoplastic bag 200a includes multiple different deformation patterns across the width of the bag 200a. In particular, the thermoplastic bag 200a includes upper, side zones 302, 304 including a first pattern of deformations 306 (e.g., diamond shaped SELFing). The first pattern of deformations 312 can provide increased flexibility and elasticity to the upper side zones 302, 304 of the thermoplastic bag 200a proximate the side seals 214, 216. The increased flexibility and elasticity provided by the first pattern of deformations 306 can act as a shock absorber to dampen stress or strain applied on the side seals 214, 216. In particular, as objects are placed into the thermoplastic bag 200a near the side edges 206, 208, the first pattern of deformations 306 can expand to absorb some of the strain and prevent at least a portion of the strain from acting on the side seals 214, 216.

As shown in FIG. 3A, an upper, first zone 308 can include a second pattern of deformations 310. The second pattern of deformations 310 can comprise DD ring rolling and can have a size and orientation so as to direct fluid entering the thermoplastic bag 200a into a center of the thermoplastic bag 200a. An upper, second zone 312 of the thermoplastic bag 200a can include a third pattern of deformations 314. The third pattern of deformations 312 can include DD ring rolling and can have a size and orientation so as to direct fluid entering the thermoplastic bag 200a into a center of the thermoplastic bag 200a.

The thermoplastic bag 200a can have a bottom region 316, a lower region 318, a center region 320, an upper region 322, and a top region 224. The bottom region 316 extends from the bottom edge 210 a first distance toward the top edges 212. The lower region 318 extends from the bottom region 316 a second distance toward the top edges 212. The top region 324 extends from the hem a third distance toward the bottom edge 210. The upper region 322 extends from the top region 324 a fourth distance toward the bottom edge 210. The center region 320 is positioned between the upper and lower regions 322, 318.

As shown the upper, first zone 308 and the upper, second zone 312 can both be positioned in the upper region 322 such that they are aligned at a particular height. Furthermore, the upper, first zone 308 is positioned in a first side half of the thermoplastic bag 200a. The upper, second zone 312 is positioned in a second side half of the thermoplastic bag 200a. The first side half of the thermoplastic bag 200a includes the second pattern of deformations 310 and is devoid of the third pattern of deformations 314 (and optionally all of the patterns of deformations other than the second pattern of deformation 310). Similarly, the second side half of the thermoplastic bag 200a includes the third pattern of deformations 314 and is devoid of the second pattern of deformations 310 (and optionally all of the patterns of deformations other than the third pattern of deformation 314). Thus, phased deformations in the upper region 322 transition from the first deformation pattern 306 to the second pattern of deformations 310 to the third pattern of deformations 314 to the first pattern of deformations 306 across the width of the film.

A lower, middle zone 326 can include a fourth pattern of deformations 328. The fourth pattern of deformations 328 can comprise MD ring rolling. The fourth pattern of deformations 328 can comprise can have a size and orientation so as to direct fluid into a bottom of the thermoplastic bag 200a. In the lower region 318 of the thermoplastic bag 200a the patterns of deformations can vary along the width from the first pattern of deformations 306 to the fourth pattern of deformations 328 to first pattern of deformations 306.

Figure 3B:
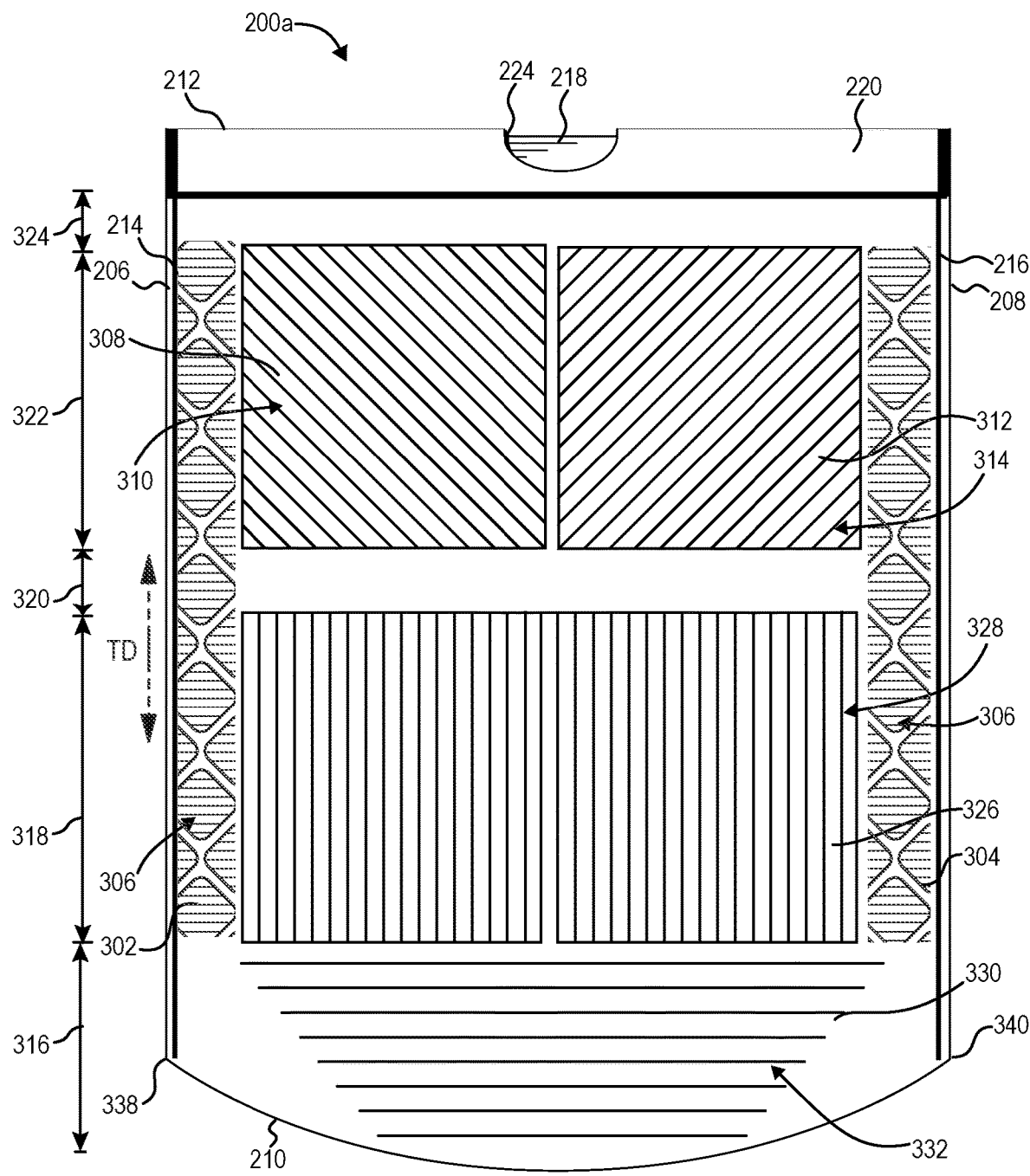
FIG. 3B illustrates a view of the thermoplastic bag with the phased deformation patterns of FIG. 3A in an expanded or stretched state in accordance with one or more implementations of the present invention.

A bottom, middle zone 330 of the thermoplastic bag 200a can include a fifth pattern of deformations 332. The fifth pattern of deformations 332 can comprise TD ring rolling or TD SELFing with deformations that decrease in width as the fifth pattern of deformations 332 nears the bottom edge 210 of the thermoplastic bag 200a. The varying width of the fifth pattern of deformations 332 can cause the bottom, middle zone 330 of the thermoplastic bag 200a to expand and extend below bottom edges of the first and second side seals 214, 216 as the thermoplastic bag 200a is strained. In particular, FIG. 3B illustrates the thermoplastic bag 200a upon being strained consistent with normal use of a trash bag. As shown by FIG. 3B, the bottom, middle zone 330 of the thermoplastic bag 200a has expanded below the bottoms of the side seals 214, 216. In particular, the size and configuration of the fifth pattern of deformations 332, when strained, creates a bowl shape and a lowest portion of the thermoplastic bag 200a. The combination of the liquid directing features of the second, third, and fourth patterns of deformations 308, 314, 328 can direct liquid into the bowl shaped area of the bottom, middle zone 330 that has expanded below the side seals 214, 216. Thus, the phased deformations of the bag can channel liquid away from the side seals 214, 216 to reduce or eliminate potential leaking of liquid at the side seals 214, 216.

In one or more implementations, the bottom, middle zone 330 of the thermoplastic bag 200a can include a liquid absorbing insert. As such, when liquid is channeled to the bottom, middle zone 330 of the thermoplastic bag 200a the liquid absorbing insert can absorb the liquid to reduce potential leaking. In particular, the liquid absorbing insert can comprise an absorbent agent, such as a super absorbent polymer, that is capable of absorbing and retaining many times its own weight in fluids. Thus, the phased deformations can direct liquid to the liquid absorbing insert at the bottom of the bag that then absorbs the liquid.

In one or more implementations, the liquid absorbing insert can comprise a mixture of absorbent material suspended in an adhesive matrix. In particular, the liquid absorbing insert can be made by intermixing an absorbent agent, such as a super absorbent polymer, with an adhesive. A super absorbent polymer can absorb and retain many times its own weight in water. Super absorbent polymers and copolymers include, but are not limited to, partially neutralized hydrogel-forming gelling materials, such as polyacrylate gelling material and acrylate grafted starch gelling material for example potassium acrylate and sodium acrylate, sodium polyacrylate, solution polymers, and super absorbent fibers. Sodium polyacrylate, for example, is a hydrophilic polymer material that can hold up to 20 times its weight in water and, in some instances, up to 50 times its weight in water. Super absorbent polymers are typically available as particulates or flake-like crystals that can be easily intermixed with and suspended in an adhesive matrix. In other implementations, instead of or in addition to the super absorbent polymer, the absorbent agent can include, but is not limited to, clay, silica, talc, diatomaceous earth, perlite, vermiculite, carbon, kaolin, mica, barium sulfate, aluminum silicates, sodium carbonates, calcium carbonates, absorbent gelling materials, creped tissue, foams, wood pulp, cotton, cotton batting, paper, cellulose wadding, sponges, and desiccants.

Figure 4:
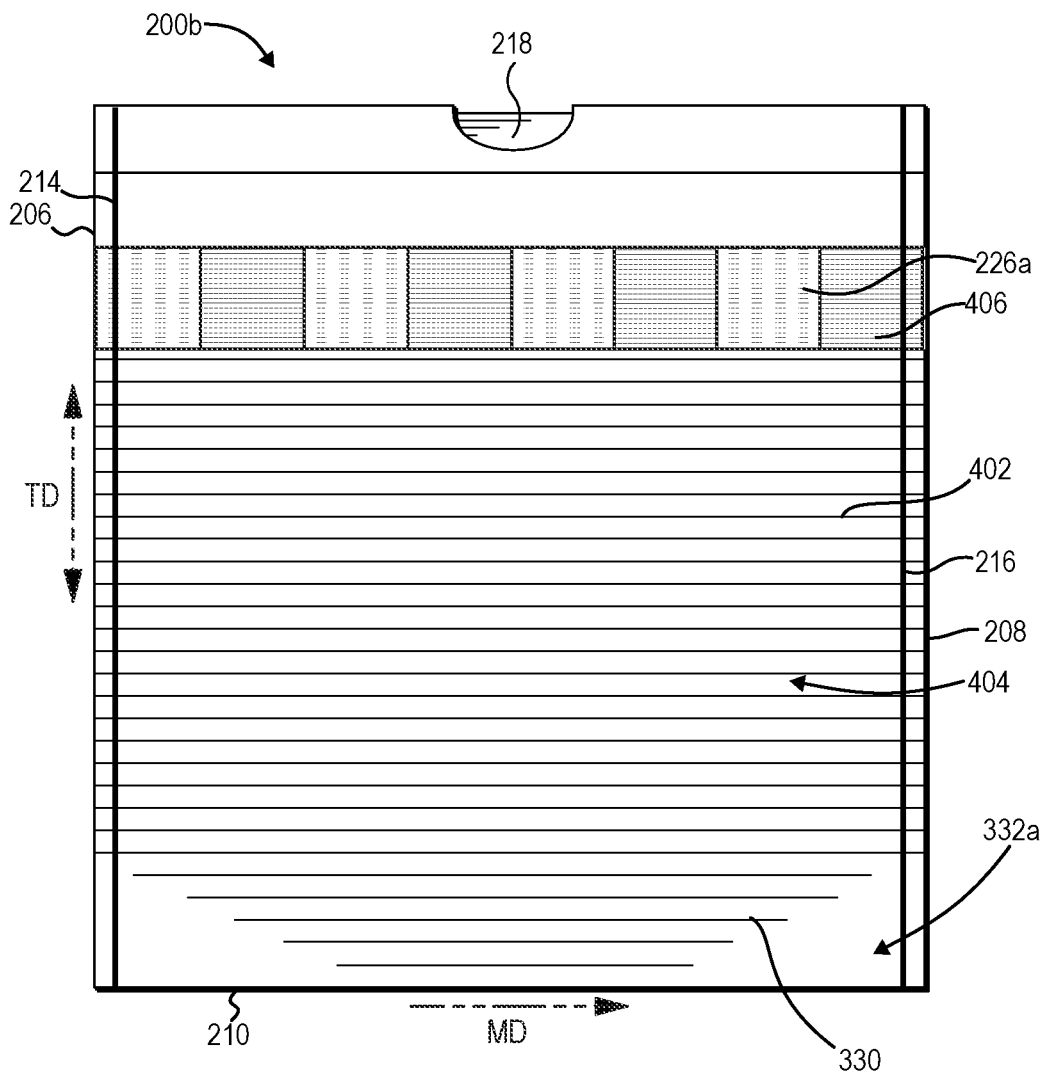
FIG. 4 illustrates a view of another thermoplastic bag with phased deformation pattern in accordance with one or more implementations of the present invention.

While each of the thermoplastic bags 200 and 200a include zones at the side edges 206, 208 devoid of deformations in which the side seals 214, 216, the present invention is not so limited. For example, FIG. 4 illustrates a thermoplastic bag 200b with phased deformations in which at least a portion of the side seals 214, 216 are formed over deformations. In particular, the thermoplastic bag 200b includes a bottom zone 330a including a first pattern of deformations 332a that decrease in width as the first pattern of deformations 332a nears the bottom edge 210 of the thermoplastic bag 200b. The varying width of the first pattern of deformations 332a can cause the bottom zone 330a of the thermoplastic bag 200b to expand and extend below bottom edges of the first and second side seals 214, 216 as the thermoplastic bag 200b is strained as described above in relation to FIGS. 3A and 3B.

As shown by FIG. 4, the bottom portions of the side seals 214, 216 can be formed in areas of the thermoplastic bag 200b devoid of deformations to help ensure that the side seals 214, 216 are strong at the corners of the bag 200b. A middle zone 402 of the bag 200b extending from the first side edges 206 to the second side edges 208 can include a second pattern of deformations 404. The second pattern of deformations 404 can comprise TD ring rolling. An upper zone 406 of the bag 200b can include a third pattern of deformations 226a similar to the checkboard pattern 226 described above in relation to FIG. 2. The third pattern of deformations 226a can also extend from the first side edges 206 to the second side edges 208. Thus, as shown by FIG. 4, the side seals 214, 216 can be formed over the second pattern of deformations 404 and the third pattern of deformations 226a. The portions of the side seals 214, 216 formed over deformations can be portions of the side seals 214, 216 less prone to leaking or failure (e.g., not the corners of the bag 202b).

Figure 5:
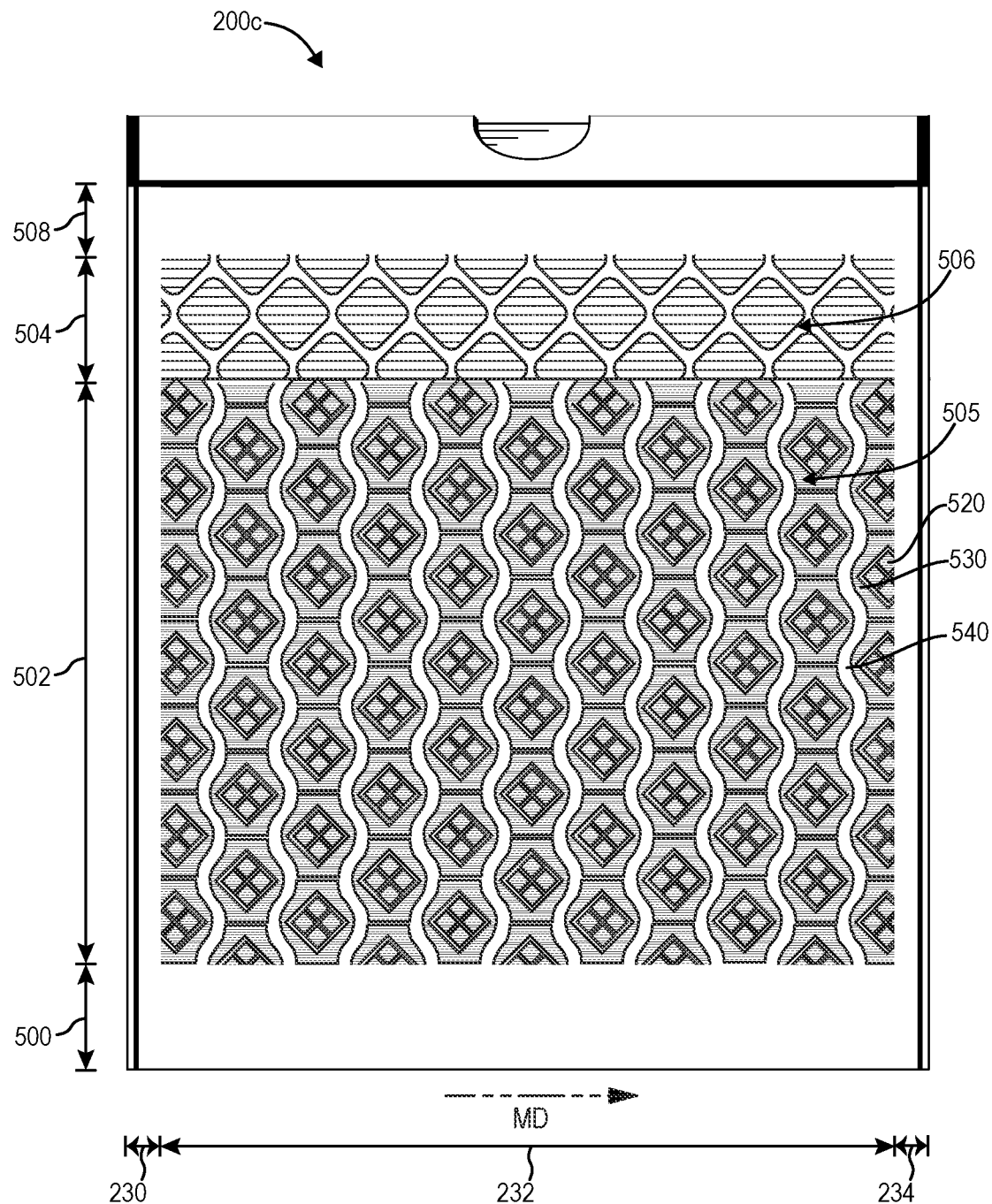
FIG. 5 illustrates a view of yet another thermoplastic bag with phased deformation patterns in accordance with one or more implementations of the present invention.

FIG. 5 illustrates yet another thermoplastic bag 200c with phased deformation patterns. Similar to the thermoplastic bag 200 of FIG. 2, the thermoplastic bag 200c includes a first zone, section, or area 230, a second zone, section, or area 232, and a third zone, section, or area 234. The first zone 230 extends from the first side edges 206 toward the second side edges 208. The third zone 234 extends from the second side edges 208 toward the first side edges 206. The second zone 232 is positioned between the first zone 230 and the third zone 234. As shown the first and third zones 230, 234 are devoid of deformations. Thus, the deformations vary across the width of the thermoplastic bag 200c from areas devoid of deformations to areas including deformations. The increased thickness and uniformity of the first and third zones 230, 234 can help ensure that the side seals 214, 216 positioned therein are strong.

The second zone 232 includes a bottom zone 500 devoid of deformations, a middle zone 502 with a first pattern of deformations 505, an upper zone 504 with a second pattern of deformations 506, and an upper zone 508 devoid of deformations. The first pattern of deformations 505 includes a first plurality of raised rib-like elements 530 in a macro pattern (a bulbous pattern) and a second plurality of raised rib-like elements 520 in a micro pattern (a diamond pattern). As shown, the second plurality of raised rib-like elements 520 in the micro pattern are nested within the macro patterns. Furthermore, the first pattern of deformations 505 includes web areas 540. The web areas 540 can surround the micro and the macro patterns of raised rib-like elements. Furthermore, as shown by FIG. 5, the web areas 540 are arranged in a sinusoidal pattern. The pattern of web areas 540 can affect how the raised rib-like elements expand and move when being strained and subsequently released. Furthermore, the pattern of the web areas 540 can direct liquid to the bottom of the bag 200c. The second pattern of deformations 506 can comprise diamond-shaped SELFing.

As previously mentioned, the phased deformations can be formed using tooling phased relative to a width of the thermoplastic bags. More specifically, the tooling is sized and configured such that one revolution (or fraction thereof) equals the width of a thermoplastic bag. In this manner, the tooling can be configured to generate deformation patterns that vary from a first side of the thermoplastic bag, along a width of the thermoplastic bag, to an opposing side of the thermoplastic bag as described above.

Figure 6A:
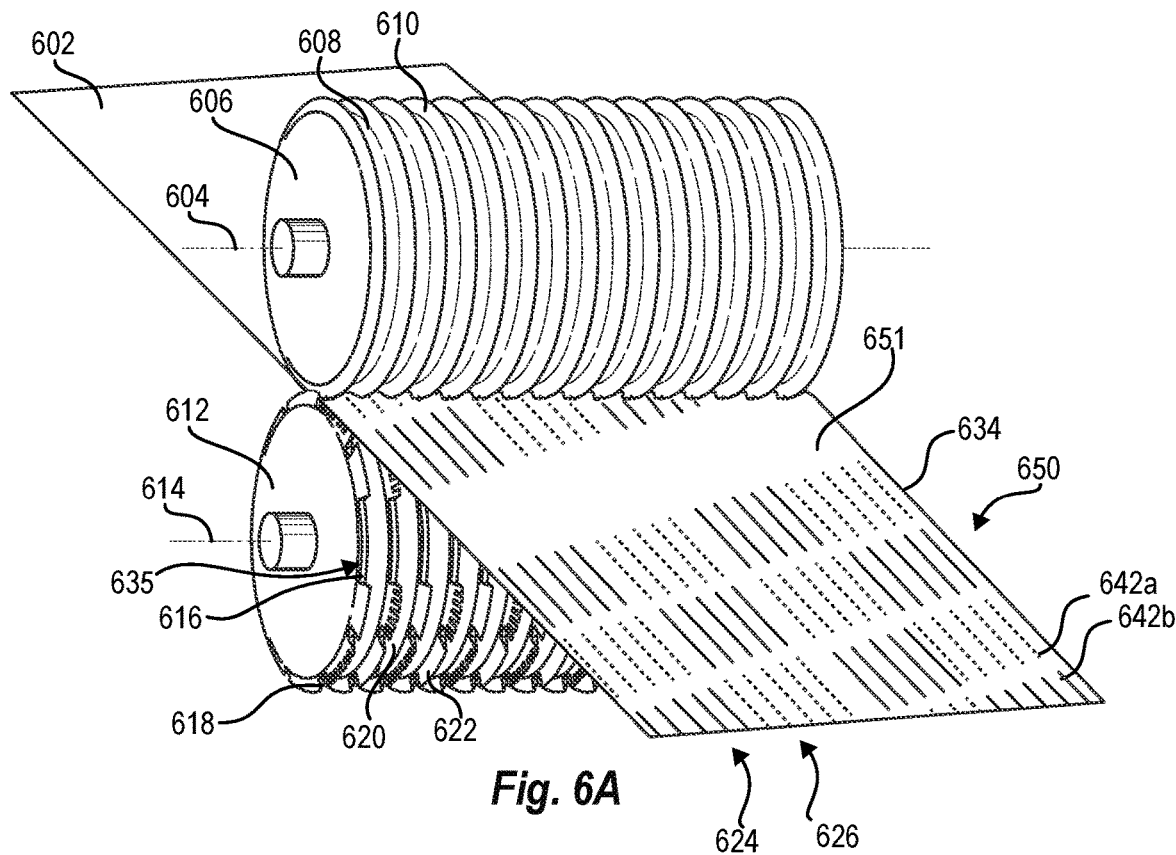
FIG. 6A illustrates a schematic diagram of a thermoplastic film passing through phased intermeshing rollers in accordance with one or more implementations of the present invention.

FIG. 6A shows a pair of SELFing intermeshing rollers 606, 612 (e.g., a first SELFing intermeshing roller 606 and a second SELFing intermeshing roller 612) for creating phased deformations. As shown in FIG. 6A, the first SELFing intermeshing roller 606 may include a plurality of ridges 610 and grooves 608 extending generally radially outward in a direction orthogonal to an axis of rotation 604. The second SELFing intermeshing roller 612 can also include a plurality of ridges 622 and grooves 620 extending generally radially outward in a direction orthogonal to an axis of rotation 614. As shown in FIG. 6A, in some embodiments, the ridges 618 of the second SELFing intermeshing roller 612 may include a plurality of notches 616 that define a plurality of spaced teeth 618.

As shown by FIG. 6A, passing a film, such as film 602, through the SELFing intermeshing rollers 606, 612 can produce a thermoplastic film 634 with one or more strainable networks formed by a structural elastic like process in which the strainable networks have a checkerboard pattern of deformations 650. As used herein, the term "strainable network" refers to an interconnected and interrelated group of regions which are able to be extended to some useful degree in a predetermined direction providing the web material with an elastic-like behavior in response to an applied and subsequently released elongation.

Figure 6B:
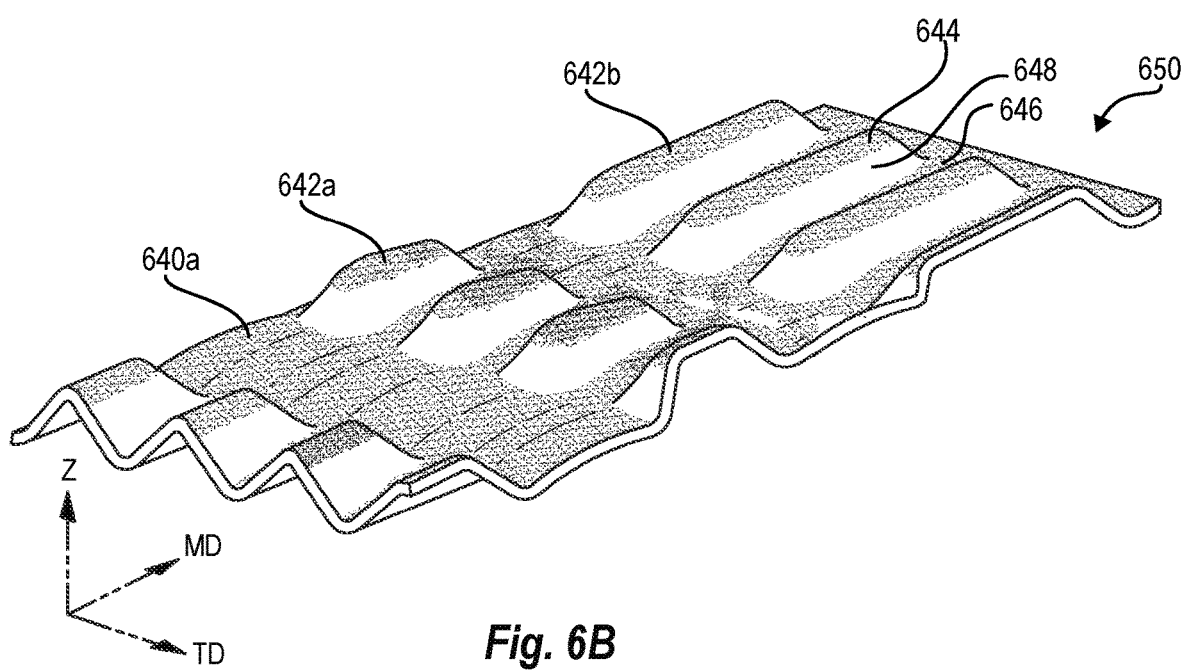
FIG. 6B illustrates an enlarged perspective view of a thermoplastic film after passing through the phased intermeshing rollers of FIG. 6A.

FIG. 6B shows a portion of the thermoplastic film 634 with the phased deformations. Referring to FIGS. 6A and 6B together, as film 602 passes through the SELFing intermeshing rollers 606, 612, the teeth 618 can press a portion of the film out of plane defined by the film to cause permanent deformation of a portion of the film in the Z-direction. For example, the teeth 618 can intermittently stretch a portion of the film 602 in the Z-direction. The portions of the film 602 that pass between the notched regions 616 of the teeth 618 will remain substantially unformed in the Z-direction. As a result of the foregoing, the thermoplastic film 634 with the deformation pattern 650 includes a plurality of isolated deformed, raised, rib-like elements 642a, 642b and at least one un-deformed portion (or web area) 640a (e.g., a relatively flat region). As will be understood by one of ordinary skill in the art, the length and width of the rib-like elements 642a, 642b depend on the length and width of teeth 618 and the speed and the depth of engagement of the intermeshing rollers 606, 612. The rib-like elements 642a, 642b and the un-deformed web areas 640a form a strainable network.

As shown in FIG. 6B, the strainable network of the film 634 can include first thicker regions 644, second thicker regions 646, and stretched, thinner transitional regions 648 connecting the first and second thicker regions 644, 646. The first thicker regions 644 and the stretched, thinner regions 648 can form the raised rib-like elements 642a, 642b of the strainable network. In one or more embodiments, the first thicker regions 644 are the portions of the film with the greatest displacement in the Z-direction. In one or more embodiments, because the film is displaced in the Z-direction by pushing the rib-like elements 642a, 642b in a direction perpendicular to a main surface of the thermoplastic film (thereby stretching the regions 648 upward) a total length and width of the film does not substantially change when the film is subjected to the SELFing process of one or more embodiments of the present invention. In other words, the film 602 (film prior to undergoing the SELFing process) can have substantially the same width and length as the film 634 resulting from the SELFing process.

As shown by FIG. 6B, the rib-like elements can have a major axis and a minor axis (i.e., the rib-like elements are elongated such that they are longer than they are wide). As shown by FIGS. 6A and 6B, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

The rib-like elements 642a, 642b can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELFed film or articles embodying the such a film are subjected to an applied load or force. Types of geometric deformation include, but are not limited to bending, unfolding, and rotating.

Thus, upon application of a force, the rib-like elements 642a, 642b can undergo geometric deformation before undergoing molecular-level deformation. For example, a strain applied to the film 634 in a perpendicular to the major axes of the rib-like elements 642a, 642b can pull the rib-like elements 642a, 642b back into plane with the web areas 640a prior to any molecular-level deformation of the rib-like elements 642a, 642b. Geometric deformation can result in significantly less resistive forces to an applied strain than that exhibited by molecular-level deformation.

In one or more implementations, the first pattern 624 is visually distinct from the second pattern 626. As used herein, the term "visually distinct" refers to features of the web material which are readily discernible to the normal naked eye when the web material or objects embodying the web material are subjected to normal use.

In one or more embodiments, the first pattern 624 of raised rib-like elements 642b comprises a macro pattern while the second pattern 626 of raised rib-like elements 642a comprises a macro pattern. As used herein a macro pattern is a pattern that is larger in one or more ways than a micro pattern. For example, as shown by FIG. 6A, the macro pattern 624 has larger/longer raised rib-like elements 642b than the raised rib-like elements 642a of the micro pattern 626. In alternative embodiments, the surface area of a given macro pattern 624 covers more surface area than a surface area covered by a given micro pattern 626. In still further embodiments, a macro pattern 624 can include larger/wider web portions between adjacent raised rib-like elements than web portions between adjacent raised rib-like elements of a micro pattern 626.

As mentioned above, the raised rib-like elements 642b are longer than the raised rib-like elements 642a. In one or more embodiments, the raised rib-like elements 642b have a length at least 1.5 times the length of the raised rib-like elements 642a. For example, the raised rib-like elements 642b can have a length between 1.5 and 20 times the length of the raised rib-like elements 642a. In particular, the raised rib-like elements 642b can have a length 2, 3, 4, 5, 6, 8, or 10 times the length of the raised rib-like elements 642a.

As shown by FIGS. 6A and 6B, the intermeshing roller 612 can further include at least one region 635 devoid of ridges 610 and grooves 608 and/or a region with ridges and grooves in another configuration to form a deformation pattern other than a checkerboard pattern (e.g., groves and ridges that form a diamond pattern). The region 635 can extend along a length of the intermeshing roller 612. As shown by FIG. 6A, the region 635 can result in no deformations being formed in a zone 651 of the film 634 with phased deformations.

Figure 6D:
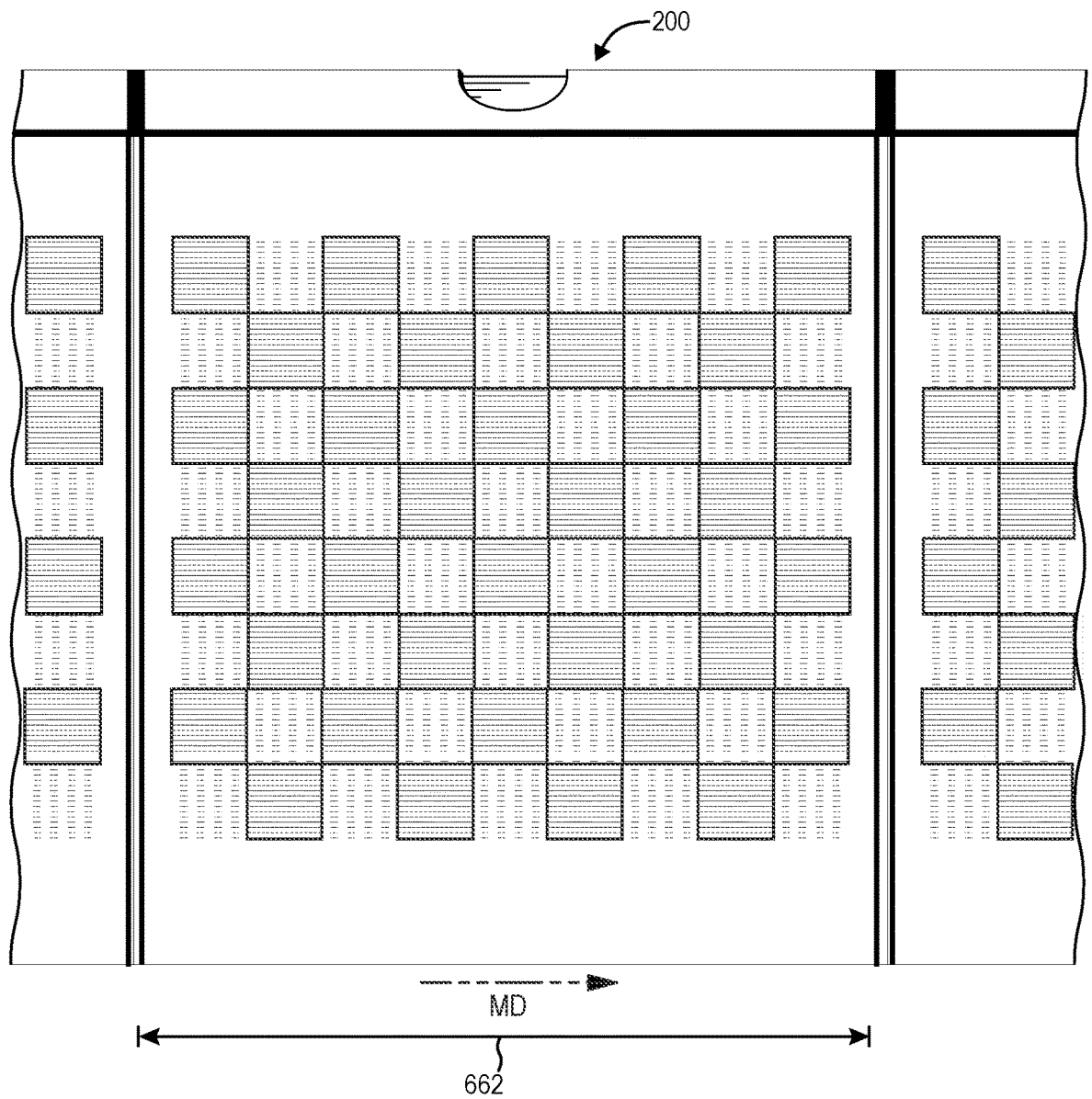
FIG. 6D illustrates a view of a series of thermoplastic bags with phased deformation patterns in accordance with one or more implementations of the present invention formed using the phased intermeshing rollers of FIG. 6A.

As mentioned, the tooling (e.g., at least one of the intermeshing rollers 606, 612) is sized and configured such that one revolution (or fraction thereof) equals the width of a thermoplastic bag. For example, at least one of the intermeshing rollers 606, 612 are sized and configured that one revolution equals the width of a single thermoplastic bag. For example, as shown in FIG. 6D, the circumference of the intermeshing rollers (starting at the middle of the region 635) can equal the width 662 of a thermoplastic bag 200. Thus, considering FIGS. 6C and 6D, a method of forming thermoplastic bags with phased deformations can involve advancing a thermoplastic film 602 into a pair of intermeshing rollers 606, 612. Advancing the thermoplastic film 602 through the intermeshing rollers 606, 612 creates deformations 642a, 642b in the thermoplastic film. A single rotation of the intermeshing rollers 606, 612 spans a first length of the thermoplastic film. The thermoplastic bags have a width that is a multiple of the first length. As described below, after forming the phased deformation patterns, the method can involve forming pairs of side seals in the thermoplastic film thereby defining thermoplastic bags having a width that is a multiple of the first length. In the embodiment shown in FIGS. 6C and 6D, the multiple of the first length is 1, such the width 662 of the thermoplastic bag 200 equals, or approximately equals, the circumference of the intermeshing rollers 606, 612.

In alternative embodiments, the multiple of the first length is 2, 3, 4, 5, or so on. For example, FIG. 7 illustrates a pair of intermeshing rollers 606a, 612b having a circumference that is two times the width 662 of a thermoplastic bag 200. As shown by FIG. 7, the intermeshing roller 612b has two regions 635a, 635b devoid of devoid of ridges 610 and grooves 608.

Figure 8:
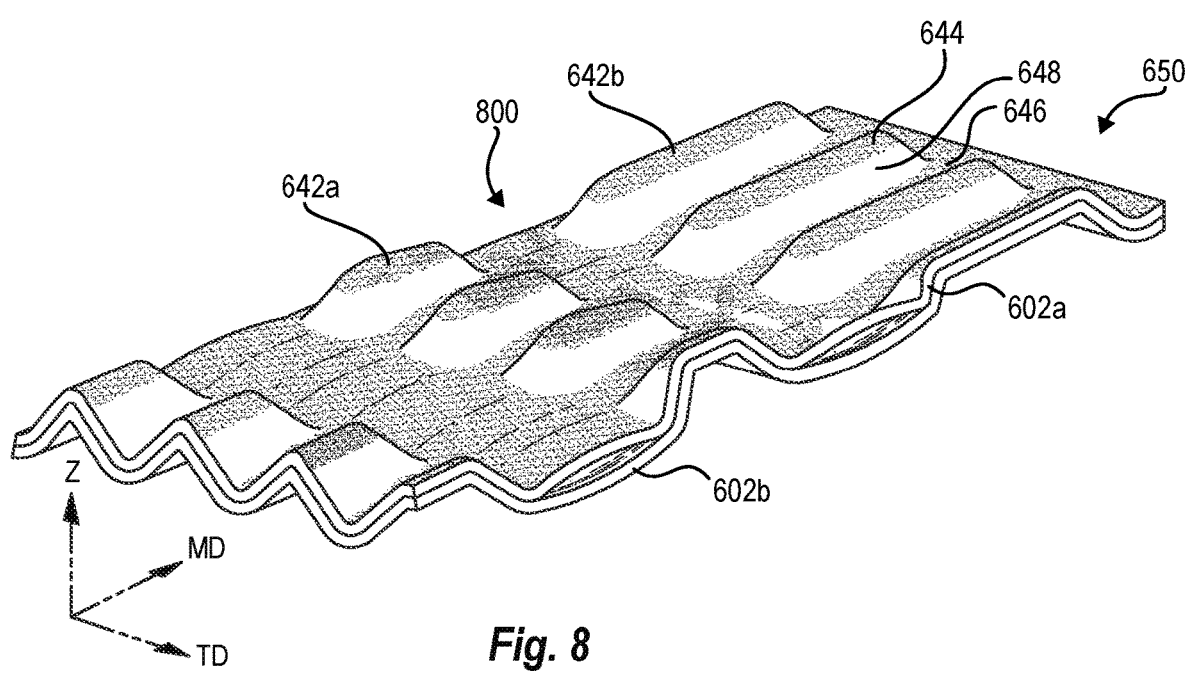
FIG. 8 illustrates an enlarged perspective view of a multi-layered thermoplastic film created by passing two films together through the phased intermeshing rollers of FIG. 6A in accordance with one or more implementations of the present invention.

In one or more implementations, the films (and thus the sidewalls) with phased deformations may comprise two or more distinct thermoplastic films (i.e., two films extruded separately). The distinct thermoplastic films can be non-continuously bonded to one another. For example, in one or more embodiments two film layers can be passed together through a pair of phased SELFing rollers to produce a multi-layered lightly-bonded laminate film 800 with the phased deformations 650, as shown in FIG. 8. The multi-layered lightly-bonded laminate film 800 can comprise a first thermoplastic film 602a partially discontinuously bonded to a second thermoplastic film 602b. In one or more embodiments, the bonds between the first thermoplastic film 602a and the second thermoplastic film 602b are aligned with the first thicker regions 644 and are formed by the pressure of the phased SELFing rollers displacing the raised rib-like elements 642b, 642a. Thus, the bonds can be parallel to the raised rib-like elements 642b, 642a and be positioned between raised rib-like elements 642b, 642a of the first thermoplastic film 602a and the second thermoplastic film 602b.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of co-extruded multilayer films comprising one or more tie layers. As a verb, "laminate" means to affix or adhere (by means of, for example, adhesive bonding, pressure bonding, ultrasonic bonding, corona lamination, static bonds, cohesive bonds, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

In one or more embodiments, the first and second films 602a, 602b may be discontinuously bonded together via one or more MD rolling, TD rolling, DD ring rolling, SELFing, pressure bonding, corona lamination, adhesives, or combinations thereof. In some implementations, the first and second films 602a, 602b may be bonded such that the bonded regions have bond strengths below a strength of the weakest film of the first and second films 602a, 602b. In other words, the bonded regions may fail (e.g., break apart) before the first or second films 602a, 602b fail. As a result, discontinuously bonding the first and second films 602a, 602b may can also increase or otherwise modify one or more of the tensile strength, tear resistance, impact resistance, or elasticity of the films. Furthermore, the bonded regions between the first and second films 602a, 602b may provide additional strength. Such bonded regions may be broken to absorb forces rather than such forces resulting in tearing of the film.

Furthermore, heat, pressure, ultrasonic bonding, corona treatment, or coating (e.g., printing) with adhesives may be employed in connection with pressure bonding created by passing a pair of films through phased intermeshing rollers. Treatment with a corona discharge can enhance any of the above methods by increasing the tackiness of the film surface so as to provide a stronger lamination bond, but which is still weaker than the tear resistance of the individual layers. Discontinuously bonding the first and second films 602a, 602b together results in un-bonded regions and bonded regions between the first and second films 602a, 602b.

When a multi-layered lightly-bonded laminate film 800 with phased deformations 650 is formed into a bag, the first film 602a can form an outer layer of each of the first and second sidewalls and the second film 602b can form an inner layer of each of the first and second sidewalls.

The use of multiple layers also allows for the creation of still further aesthetic features. In particular, one or more implementations include a multi-layer film with a first layer that has a first color, transparency, or translucency. The first layer is non-continuously bonded to a second layer such that the films are intermittingly in contact with each other. The second layer has a second color, transparency, or translucency that differs from the first color, transparency, or translucency. One or more of the spacing between the films, the texture provided by the phased deformations, and the combination of the first color, transparency, or translucency and the second color, transparency, or translucency can provide the structure with an unexpected appearance that differs from an appearance of the individual layers. For example, the multi-layer film can appear to be a color other than a color of the first layer or the second layer. For example, the multi-layer film can have color that differs from the color of both the first film and the second film.

In one or more embodiments, the first layer can comprise a transparent layer and the second layer can comprise a pigmented layer (and in particular a non-metallic pigment). In such embodiments, the multi-layer film can have a metallic appearance despite the lack of any metallic pigment. In another embodiment, the first layer can comprise a layer lightly pigmented with a first color and the second layer can comprise a layer pigmented with a second color (that differs from the first color). In such embodiments, the multi-layer film can have an appearance of a third color despite the lack of any pigment of the third color. In one or more embodiments, the third color is a lighter color than the color of the second layer.

One or more implementations can further include bringing portions of the substantially un-pigmented or lightly pigmented first layer into intimate or direct contact with the pigmented under layer. Bringing the under and first layers into direct contact can cause an appearance or color change to the areas or regions in intimate contact. In particular, the areas of intimate contact can lose the unique appearance and instead have the color of the first or the second layer. Thus, one or more implementations involve creating visually-distinct regions by bringing the first and second layers into intimate contact.

One will appreciate in light of the disclosure here that the first and second layers of the multi-layer film with the unexpected appearance can be brought into intimate contact with each other using various different techniques. In particular, one or more implementations involve heat-sealing the layers of the multi-layer film with the unexpected appearance together. The heat-seals can create intimate contact between the first layer and the second layer causing the heat-sealed area to take on the visual characteristics one of the first or second layers. Thus, rather than having the unexpected appearance (for example, a metallic appearance), the heat-sealed areas can appear the color of the first layer or the second layer.

As previously mentioned, the phased deformations can be formed using phased SELFing rollers, phased MD ring rollers, phased TD ring rollers, phased DD ring rollers, phased embossing rollers, or phased rollers that have a combination of one or more of the foregoing technologies. For example, the phased rollers used to create the thermoplastic bag 200a can comprise one or more of phased SELFing portions, phased DD ring rolling portions, phased MD ring rolling portions, phased TD ring rolling portions, phased embossed portions, or in the case of a multi-layered structure phased portions of the laminate brought into intimate contact.

Referring now to FIG. 9A, a cross-section of a portion of a pair of phased MD ring rollers is shown forming deformations and bonding a pair of films together. In particular, FIG. 9A illustrates an exemplary processes of partially discontinuously bonding adjacent films 915 in accordance with an implementation of the present invention to create a multi-layer film 913 with phased deformation patterns. In particular, FIG. 9A illustrates an MD ring rolling process that partially discontinuously laminates individual adjacent layers 915 by passing the layers through a pair of phased MD intermeshing rollers 912, 914. As a result of MD ring rolling, the multi-layered film 913 with phased deformation patterns is also intermittently stretched in the machine direction MD.

The intermeshing rollers 912, 914 can closely resemble fine pitch spur gears. In particular, the MD intermeshing rollers 912, 914 can include a plurality of protruding ridges 924, 926. The ridges 924, 926 can extend along the MD intermeshing rollers 912, 914 in a direction generally parallel to axes of rotation and perpendicular to the machine direction of the film 913 with phased deformation patterns passing through the MD intermeshing rollers 912, 914.

Furthermore, the ridges 924, 926 can extend generally radially outward from the axes of rotation. The tips of ridges 924, 926 can have a variety of different shapes and configurations. For example, the tips of the ridges 924, 926 can have a rounded shape as shown in FIG. 9A. In alternative implementations, the tips of the ridges 924, 926 can have sharp angled corners. FIG. 9A also illustrates that grooves 928, 930 can separate adjacent ridges 924, 926.

The ridges 924 on the first roller 912 can be offset or staggered with respect to the ridges 926 on the second roller 914. Thus, the grooves 928 of the first roller 912 can receive the ridges 926 of the second roller 914, as the phased MD intermeshing rollers 912, 914 intermesh. Similarly, the grooves 930 of the second roller 914 can receive the ridges 924 of the first roller 912.

One will appreciate in light of the disclosure herein that the configuration of the ridges 924, 926 and grooves 928, 930 can prevent contact between ridges 924, 926 during intermeshing so that no rotational torque is transmitted during operation. Additionally, the configuration of the ridges 924, 926 and grooves 928, 930 can affect the amount of stretching and the bond strength resulting from partially discontinuous lamination as the film layers 915 pass through phased MD intermeshing rollers 912, 914.

The pitch and depth of engagement of the ridges 924, 926 can determine, at least in part, the amount of incremental stretching and partially discontinuous lamination caused by the phased MD intermeshing rollers 912, 914. As shown by FIG. 9A, the pitch 932 is the distance between the tips of two adjacent ridges on the same roller. The "depth of engagement" ("DOE") 934 is the amount of overlap between ridges 924, 926 of the different phased MD intermeshing rollers 912, 914 during intermeshing.

The ratio of DOE 934 to pitch 932 can determine, at least in part, the bond strength provided by the partially discontinuous bonding. According to one embodiment, the ratio of DOE to pitch provided by any ring rolling operation is less than about 1.1:1, suitably less than about 1.0:1, suitably between about 0.5:1 and about 1.0:1, or suitably between about 0.8:1 and about 0.9:1.

As shown by FIG. 9A, the direction of travel of the film layers 915 through the phased MD intermeshing rollers 912, 914 is parallel to the machine direction and perpendicular to the transverse direction. As the thermoplastic film layers 915 pass between the phased MD intermeshing rollers 912, 914, the ridges 924, 926 can incrementally stretch the film layers 915 in the machine direction. In one or more implementations, stretching the film layers 915 in the machine direction can reduce the gauge of the film and increase the length of the film layers 915. In other implementations, the film layers 915 may rebound after stretching such that the gauge of the film layers 915 are not decreased (e.g., the same or larger gauge). Furthermore, in one or more implementations, stretching the film layers 915 in the machine direction can reduce the width of the film layers 915. For example, as film layers 915 are lengthened in the machine direction, the length of the film layers 915 can be reduced in the transverse direction.

In particular, as the film layers 915 proceed between the MD intermeshing rollers 912, 914, the ridges 924 of the first roller 912 can push the film layers 915 into the grooves 930 of the second roller 914 and vice versa. The pulling of the film layers 915 by the ridges 924, 926 can stretch the film layers 915. The MD intermeshing rollers 912, 914 may not stretch the film layers 915 evenly along their length. Specifically, the MD intermeshing rollers 912, 914 can stretch the portions of the film layers 915 between the ridges 924, 926 more than the portions of the film layers 915 that contact the ridges 924, 926. Thus, the MD intermeshing rollers 912, 914 can impart or form a generally striped pattern 36 into the film layers 915. As used herein, the terms "impart" and "form" refer to the creation of a desired structure or geometry in a film upon stretching the film that will at least partially retain the desired structure or geometry when the film is no longer subject to any strains or externally applied forces.

FIG. 9A illustrates that the film layers 915 (i.e., the films that are yet to pass through the MD intermeshing rollers 912, 914) can have a substantially flat top surface 938 and substantially flat bottom surface 940. The multi-layer film 913 with phased deformation patterns may comprise two layers 910 and 910' that are initially separate from one another. The film layers 915 can have an initial thickness or starting gauge 942 (i.e., the sum of 942*a* and 942*b*) extending between its major surfaces (i.e., the top surface 938 and the bottom surface 940). In at least one implementation, the starting gauge 942, as well as the gauge 942*a*, 942*b* of individual layers 910 and 910' can be substantially uniform along the length of the film layers 915. Because the contacting surfaces of each layer 910 and 910' are somewhat tacky, the layers become lightly bonded together as they are pulled through and stretched by MD intermeshing rollers 912, 914. Those areas that are un-stretched or stretched less become bonded together.

In one or more implementations, the film layers 915 need not have an entirely flat top surface 938, but may be rough or uneven. Similarly, the bottom surface 940 or the second oriented surfaces of layers 910 and 910' of the film layers 915 can also be rough or uneven. Further, the starting gauge 942, 942*a*, and 942*b* need not be consistent or uniform throughout the entirety of film layers 915. Thus, the starting gauge 942, 942*a*, and 942*b* can vary due to product design, manufacturing defects, tolerances, or other processing issues. According to one embodiment, one or more of the individual layers 910 and 910' may be pre-stretched (e.g., through MD ring rolling, TD ring rolling, etc.) before being positioned adjacent to the other layer (910' or 910, respectively).

FIG. 9A illustrates that film layers 915, can include two initially separate film layers 910, 910'. In an alternative implementation, the film layers 915 (and thus the resultant multi-layer film 913 with phased deformation patterns) can include three initially separate film layers: a middle film layer and two first film layers. In other embodiments, more than three layers may be provided (four, five, six, or more partially discontinuously or discontinuously laminated layers).

As seen in FIG. 9A, upon stretching and partially discontinuously laminating the adjacent layers 915, the intermittingly bonded and stretched multi-layer film 913 with phased deformation patterns can include a pattern 936. The pattern 936 can include alternating series of stretched (or more stretched) regions or thinner webs 946 adjacent to un-stretched regions (or less stretched) or thicker ribs 944. FIG. 9A illustrates that the phased MD intermeshing rollers 912, 914 can incrementally stretch and partially discontinuously bond films 910, 910' to create the multi-layer film 913 with phased deformation patterns including bonded regions or bonds 949 and un-bonded regions 947. For example, FIG. 9A illustrates that the film layers 910, 910' of the multi-layer film 913 with phased deformation patterns can be laminated together at the thicker ribs 944 while the stretched (i.e., thinner) regions 946 may not be laminated together.

As shown by FIG. 9A the bonded regions 949 of the multi-layer film 913 with phased deformation patterns can have an average thickness or gauge 950a. The average gauge 590a can be approximately equal to the combined starting gauges 942a, 942b of the starting films. In the Figures, separation between the layers at unbounded regions 947 is exaggerated for purposes of clarity. In one or more implementations, the average gauge 950a can be less than the combined starting gauges 942a-942b. The films 910, 910' of the un-bonded regions 947 can each have an average thickness or gauge 942c, 942d. In one or more implementations, the average gauges 942c, 942d are less than the starting gauges 942a, 942b. Although the un-stretched regions or thicker ribs 944 of the multi-layered lightly-laminated films may be stretched to a small degree by phased MD intermeshing rollers 912, 914 (or stretched in a separate operation), the un-stretched regions or thicker ribs 944 may be stretched significantly less compared to the stretched regions 946.

In any event, FIG. 9A illustrates that MD intermeshing rollers 912, 914 can process the initially separately layered films 915 into MD incrementally-stretched multi-layer film 913 with phased deformation patterns. As previously mentioned, the MD incrementally-stretched multi-layer film 913 with phased deformation patterns can include a pattern 936 of deformations where the bonding occurs along a continuous line or region along the width of the film, parallel to the TD direction. The pattern 936 can include alternating series of un-bonded regions 947 and bonded regions 949. The bonded regions 949 can comprise bonds between un-stretched regions or thicker ribs 944 of the films 910, 910'. In other words, the bonds of the MD incrementally-stretched multi-layer film 913 with phased deformation patterns can be positioned directly between, be aligned with, and bond together un-stretched regions or thicker ribs 944. Along related lines, the un-bonded regions 947 can separate the stretched or thinner regions 946.

As mentioned above in relation to FIG. 6A, phased intermeshing rollers can include a region 635 devoid of ridges and groves to form zones lacking deformations (e.g., zones at the side edges of bags where side seals are formed). Alternatively, rather than lacking a region devoid of ridges and groves, the phased intermeshing rollers can include a region with ridges and groves of reduced height relative to other regions of the phased intermeshing rollers that create the deformations. For example, FIG. 9B illustrates a cross-section of a portion of a pair of phased MD ring rollers with ridges of reduced height. As shown by a comparison with FIG. 9A, the ridges 924a, 926a and grooves 928a, 930a with reduced height result in a smaller DOE 934a (e.g., 10 to 20 mils). The ridges with reduced height 924a, 926a and the smaller DOE 934a result in a resultant film with 910a that is lacking in deformations or includes deformations having a reduced size. By including ridges with reduced height 924a, 926a rather than a region 635 devoid of ridges and groves, the phased intermeshing rollers can maintain contact with the film to reduce bunching or other shifting of the film during a high speed manufacturing process.

Figure 10:
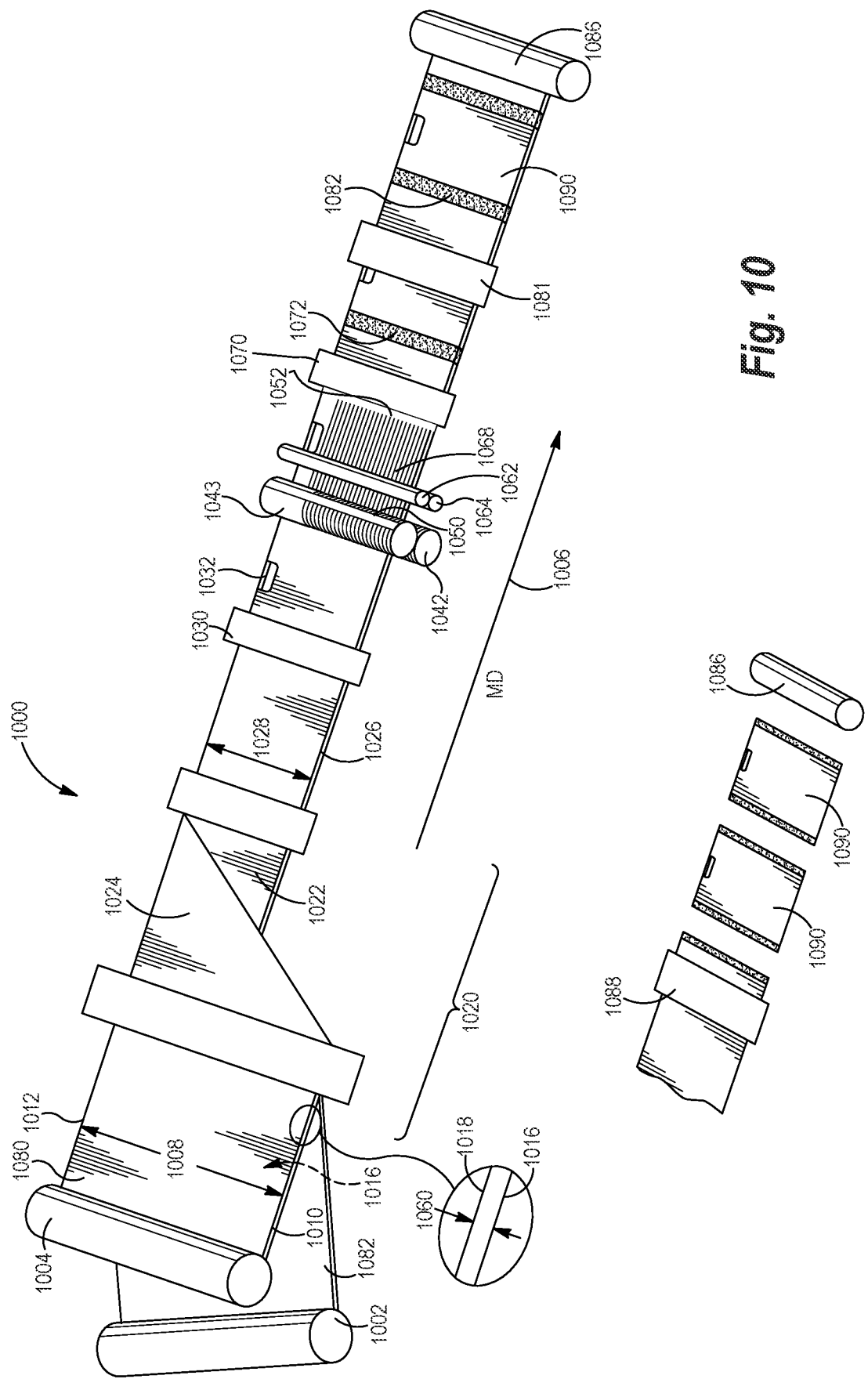
FIG. 10 illustrates a schematic diagram of a bag manufacturing process in accordance with one or more implementations of the present invention.

One or more implementations of the present invention can also include methods of forming thermoplastic bags with phased deformations. FIG. 10 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

In particular, to produce thermoplastic bags with phased deformations, continuous webs of thermoplastic material may be processed through a high-speed manufacturing environment such as that illustrated in FIG. 10. In the illustrated process 1000, production may begin by unwinding a first continuous web or film 1080 of a first thermoplastic material from a roll 1004 and advancing the web along a machine direction 1006. The unwound web 1080 may have a width 1008 that may be perpendicular to the machine direction 1006, as measured between a first edge 1010 and an opposite second edge 1012. The unwound web 1080 may have an initial average thickness 1060 measured between a first surface 1016 and a second surface 1018. In other manufacturing environments, the web 1080 may be provided in other forms or even extruded directly from a thermoplastic forming process.

The process 1000 further can optionally involve unwinding a second continuous web or film 1082 of a second thermoplastic material from a roll 1002 and advancing the web along a machine direction 1006. The second film 1082 can comprise, a width, and/or a thickness that is similar or the same as the first film 1080. In alternative one or more implementations, one or more of the width, and/or thickness of the second film 1082 can differ from that of the first film 1080.

To provide sidewalls of the finished bag, the film(s) 1080, 1082 may be folded into a first half 1022 and an opposing second half 1024 about the machine direction 1006 by a folding operation 1020. When so folded, the first edge 1010 may be moved adjacent to the second edge 1012 of the film(s) 1080, 1082. Accordingly, the width of the film(s) 1080, 1082 proceeding in the machine direction 1006 after the folding operation 1020 may be a width 1028 that may be half the initial width 1008. As may be appreciated, the portion mid-width of the unwound film(s) 1080, 1082 may become the outer edge 1026 of the folded web. In any event, the hems may be formed along the adjacent first and second edges 1010, 1012 and a draw tape 1032 may be inserted during a hem and draw tape operation 1030.

To form phased deformations in the film(s) 1080, 1082 and optionally bond multiple films together, the processing equipment includes phased intermeshing rollers 1042, 1043 such as those described herein above. The folded film(s) 1080, 1082 may be advanced along the machine direction 1006 between the phased intermeshing rollers 1042, 1043, which may be set into rotation in opposite rotational directions to impart the resulting phased deformation pattern 1068. To facilitate formation of the deformations, the phased intermeshing rollers 1042, 1043 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

The implementation shown in FIG. 10 includes phased intermeshing rollers 1042, 1043 with a region 1050 devoid of ridges and grooves or including ridges and grooves of reduced height to form zones 1052 devoid of deformations or including deformations of reduced size. In alternative implementations, the phased intermeshing rollers can lack a region 1050 devoid of ridges and grooves or including ridges and grooves of reduced height. Alternatively, the phased intermeshing rollers can include ridges and grooves in different patterns or formations that vary along the circumference and/or length of the phased intermeshing rollers. In any event, the phased intermeshing rollers can form phased deformations into the folded film(s) 1080, 1082. In alternative implementations, the film(s) 1080, 1082 pass through the phased intermeshing rollers prior to the folding operation 1020 and/or prior to the draw tape operation 1030.

In the illustrated implementation, the phased intermeshing rollers 1042, 1043 may be arranged so that they are co-extensive with or wider than the width 1028 of the folded film(s) 1080, 1082. In one or more implementations, the deformation pattern 1068 created by intermeshing rollers 1042, 1043 may extend from proximate the folded edge 1026 to the adjacent edges 1010, 1012. To avoid imparting the deformations onto the portion of the film(s) 1080, 1082 that includes the draw tape 1032, the corresponding ends 1054 of the phased intermeshing rollers 1042, 1043 may be smooth and without the ridges and grooves. Thus, the adjacent edges 1010, 1012 and the corresponding portion of the film(s) 1080, 1082 proximate those edges that pass between the smooth ends 1054 of the phased intermeshing rollers 1042, 1043 may not be imparted with deformations.

The processing equipment may include pinch rollers 1062, 1064 to accommodate the width 1028 of the film(s) 1080, 1082. To produce the finished bag, the processing equipment may further process the folded film(s) 1080, 1082. For example, to form the parallel side edges of the finished bag, the film(s) 1080, 1082 may proceed through a sealing operation 1070 in which heat seals 1072 may be formed between the folded edge 1026 and the adjacent edges 1010, 1012. The heat seals may fuse together the halves 1022, 1024 of the folded film(s) 1080, 1082. The heat seals 1072 may be spaced apart along the folded film(s) 1080, 1082 and in conjunction with the folded outer edge 1026 may define individual bags. The heat seals 1072 may be made with a heating device, such as, a heated knife. A perforating operation 1081 may for perforations 1082 in the heat seals 1072 with a perforating device, such as, a perforating knife so that individual bags 1090 may be separated from the film(s) 1080, 1082. In one or more implementations, the film(s) 1080, 1082 may be folded one or more times before the folded film(s) 1080, 1082 may be directed through the perforating operation. The film(s) 1080, 1082 embodying the bags 1090 may be wound into a roll 1086 for packaging and distribution. For example, the roll 1086 may be placed in a box or a bag for sale to a customer.

In one or more implementations of the process, a cutting operation 1088 may replace the perforating operation 1080. The film(s) 1080, 1082 is directed through a cutting operation 1088 which cuts the film(s) 1080, 1082 at location into individual bags 1090 prior to winding onto a roll 1086 for packaging and distribution. For example, the roll 1086 may be placed in a box or bag for sale to a customer. The bags may be interleaved prior to winding into the roll 1086. In one or more implementations, the film(s) 1080, 1082 may be folded one or more times before the folded web is cut into individual bags. In one or more implementations, the bags 109i0 may be positioned in a box or bag, and not onto the roll 1086.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. Moreover, any combination of the above-described elements in all possible variations thereof is encompassed by the invention unless otherwise indicated herein or otherwise clearly contradicted by context. All changes that come within the meaning and range of equivalency of the claims are to be embraced within their scope.

We claim:

1. A thermoplastic bag, comprising:
   first and second sidewalls of a thermoplastic film material;
   a first side seal securing respective first side edges of the first and second sidewalls together;
   a second side seal securing respective second side edges of the first and second sidewalls together;
   a bottom edge, extending from the first side edges to the second sided edges; and
   phased deformations formed in the first and second sidewalls, the phased deformations extending between the first and second side edges of the thermoplastic bag, the phased deformations comprising:
   a first series of repeating deformation patterns comprising a first configuration of deformations within each respective deformation pattern, wherein the first series of repeating deformation patterns are positioned in a first side zone along the first side edges and a second side zone along the second side edge; and
   a second series of repeating deformation patterns comprising a second configuration of deformations within each respective deformation pattern, the second configuration of deformations comprising different sized deformations than the deformations of the first configuration of deformations, wherein the second series of deformations is positioned in at least one middle zone positioned in a machine direction between the first side zone and the second side zone,
   wherein: the second series of repeating deformation patterns comprises a first pattern of deformations having a first orientation within a first side half of the thermoplastic bag and a second pattern of deformations having a second orientation within a second side half of the thermoplastic bag, and the first side half of the thermoplastic bag is devoid of the second pattern of deformations and the second side half of the thermoplastic bag is devoid of the first pattern of deformations.

2. The thermoplastic bag as recited in claim 1, wherein:
   first portions of the first and second sidewalls extending from the first side edges toward the second side edges are devoid of patterns of deformations, wherein the first side seal is positioned within the first portions of the first and second sidewalls; and
   second portions of the first and second sidewalls extending from the second side edges toward the first side edges are devoid of patterns of deformations, wherein the second side seal is positioned within the second portions of the first and second sidewalls.

3. The thermoplastic bag as recited in claim 1, wherein a lower middle zone of deformations is positioned in a bottom portion of the thermoplastic bag, wherein the deformations decrease in width as the lower middle zone of deformations nears the bottom edge.

4. The thermoplastic bag as recited in claim 3, wherein the lower middle zone of deformations is sized and configured so when the thermoplastic bag is strained, the bottom portion of the thermoplastic bag expands and extends below bottom ends of the first and second side seals.

5. The thermoplastic bag as recited in claim 4, further comprising a liquid absorbing component positioned within the bottom portion of the thermoplastic bag.

6. The thermoplastic bag as recited in claim 1, wherein the first configuration of deformations comprises raised rib-like elements and the second configuration of deformations comprises incrementally-stretched rib-like elements.

7. The thermoplastic bag as recited in claim 1, wherein the first configuration of deformations and the second configuration of deformations comprise differing strength characteristics.

8. The thermoplastic bag as recited in claim 1, wherein:
the first side zone, the second side zone, and the at least one middle zone each extend from a top edge of the thermoplastic bag to the bottom edge of the thermoplastic bag.

9. The thermoplastic bag as recited in claim 8, wherein:
the first side zone and the second side zone are devoid of the second series of repeating deformation patterns and the at least one middle zone is devoid of the first series of repeating deformation patterns.

10. The thermoplastic bag as recited in claim 8, wherein the first pattern of deformations and the second pattern of deformations are sized and configured to direct liquids added to the thermoplastic bag into a center of the thermoplastic bag.

11. The thermoplastic bag as recited in claim 1, wherein the first and second sidewalls comprise multiple layers discontinuously bonded together.

12. The thermoplastic bag as recited in claim 11, wherein:
an outer layer of the first and second sidewalls has a first color;
an inner layer of the first and second sidewalls has a second color created by a pigment, the first color differing from the second color; and
portions of the outer layer in intimate contact with the inner layer comprise the second color.

13. A multi-layer thermoplastic bag comprising:
a first multi-layer sidewall comprising a first thermoplastic film layer and a second thermoplastic film layer;
a second multi-layer sidewall comprising a third thermoplastic film layer and a fourth thermoplastic film layer;
a first side seal securing respective first side edges of the first and second multi-layer sidewalls together;
a second side seal securing respective second side edges of the first and second multi-layer sidewalls together; and
phased deformations formed in the first and second multi-layered sidewalls, the phased deformations extending between the first and second side edges, wherein:
the phased deformations bond the first and second thermoplastic film layers together and bond the third and fourth thermoplastic film layers together,
the phased deformations include a first series of deformation patterns comprising a first configuration of deformations within each respective deformation pattern, wherein the first series of deformation patterns are positioned in a first side zone along the first side edges and a second side zone along the second side edges, the first side zone and the second side zone each extending from a top edge to a bottom edge of the multi-layer thermoplastic bag, and
the phased deformations include a second series of deformation patterns comprising a second configuration of deformations within each respective deformation pattern, the second configuration of deformations comprising different sized deformations than the deformations of the first configuration of deformations, wherein second series of deformations is positioned in at least one middle zone positioned in a machine direction between the first side zone and the second side zone, the at least one middle zone extending from the top edge to the bottom edge,
wherein the first side zone and the second side zone are devoid of the second series of repeating deformation patterns and the at least one middle zone is devoid of the first series of repeating deformation patterns wherein the second series of deformation patterns, within an upper middle zone of the at least one middle zone, comprises a first pattern of deformations and a second pattern of deformations that are sized and oriented to direct liquids added to the multi-layer thermoplastic bag into a center of the multi-layer thermoplastic bag.

14. The multi-layer thermoplastic bag of claim 13, wherein:
first portions of the first and second multi-layer sidewalls extending from the first side edges toward the second side edges are devoid of patterns of deformations, wherein the first side seal is positioned within the first portions of the first and second multi-layer sidewalls; and
second portions of the first and second multi-layer sidewalls extending from the second side edges toward the first side edges are devoid of patterns of deformations, wherein the second side seal is positioned within the second portions of the first and second sidewalls.

15. The multi-layer thermoplastic bag of claim 13, wherein the first configuration of deformations and the second configuration of deformations comprise differing types of deformations.

16. The multi-layer thermoplastic bag of claim 13, wherein:
a first side half of the multi-layer thermoplastic bag is devoid of the second pattern of deformations and a second side half of the multi-layer thermoplastic bag is devoid of the first pattern of deformations.

17. The multi-layer thermoplastic bag of claim 13, further comprising a lower middle zone of deformations positioned in a bottom portion of the multi-layer thermoplastic bag, the deformations in the lower middle zone decreasing in width as the lower middle zone deformations approaches a bottom edge of the multi-layer thermoplastic bag.

18. The multi-layer thermoplastic bag of claim 17, wherein the lower middle zone of deformations is sized and configured so when the multi-layer thermoplastic bag is strained, the bottom portion of the multi-layer thermoplastic bag expands and extends below bottom ends of the first and second side seals.

19. The multi-layer thermoplastic bag of claim 13, wherein the first side zone extends in a transverse direction with a uniform width along the first side edges and the second side zone extends in transverse direction with a uniform width along the second side edges.

20. The multi-layer thermoplastic bag of claim 19, wherein the first configuration of deformations is configured to increase a film strength of the multi-layer thermoplastic bag in proximity to the first and second side seals.

* * * * *